United States Patent
Caruana et al.

(10) Patent No.: US 10,983,602 B2
(45) Date of Patent: Apr. 20, 2021

(54) IDENTIFYING AN INPUT DEVICE

(71) Applicant: Microsoft Technology Licensing, LLC, Redmond, WA (US)

(72) Inventors: Jonathan J. Caruana, Woodinville, WA (US); Hamze M. Kalache, Bellevue, WA (US); Bhavana Kunigal Shankar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 15/696,077

(22) Filed: Sep. 5, 2017

(65) Prior Publication Data

US 2019/0073046 A1    Mar. 7, 2019

(51) Int. Cl.
| | | |
|---|---|---|
| G06F 3/023 | (2006.01) | |
| G06F 3/038 | (2013.01) | |
| G06F 11/30 | (2006.01) | |
| G06F 3/0354 | (2013.01) | |
| G06K 9/00 | (2006.01) | |
| G06K 9/46 | (2006.01) | |
| G06F 11/34 | (2006.01) | |

(52) U.S. Cl.
CPC ............ *G06F 3/023* (2013.01); *G06F 3/038* (2013.01); *G06F 11/3041* (2013.01); *G06F 11/3051* (2013.01); *G06F 11/3055* (2013.01); *G06F 3/03543* (2013.01); *G06F 11/3438* (2013.01); *G06K 9/00503* (2013.01); *G06K 9/00536* (2013.01); *G06K 9/4642* (2013.01)

(58) Field of Classification Search
CPC ..... G06F 1/1669; G06F 3/0202; G06F 3/0414
USPC .......... 463/37, 36, 31, 7; 345/156; 713/168, 713/170; 710/14–16, 8, 65
See application file for complete search history.

(56) References Cited

U.S. PATENT DOCUMENTS

| | | | | | |
|---|---|---|---|---|---|
| 5,479,612 | A  * | 12/1995 | Kenton | ................. | G06F 21/121 726/5 |
| 7,480,656 | B2 * | 1/2009 | Harris | ..................... | A63F 13/75 |
| 7,854,007 | B2 * | 12/2010 | Sprosts | ............... | G06Q 10/107 726/24 |
| 8,160,839 | B1 * | 4/2012 | Woodings | .......... | G01R 13/0254 455/456.1 |
| 8,295,484 | B2 * | 10/2012 | Buer | ..................... | H04L 63/045 380/255 |

(Continued)

OTHER PUBLICATIONS

"How to | Connect a Gamepad or Other Device to the Wolfram System", Retrieved from <<http://reference.wolfram.com/language/howto/ConnectAGamepadOrOtherDeviceToTheWolframSystem.html.en>>, Retrieved Date: Jul. 25, 2017, 4 Pages.

(Continued)

*Primary Examiner* — Faisal M Zaman
(74) *Attorney, Agent, or Firm* — Alleman Hall Creasman & Tuttle LLP

(57) ABSTRACT

Examples are disclosed that relate to computing devices and methods for identifying an approved input device. In one example, a method comprises: receiving a plurality of input signals from a plurality of target user-actuatable input components operated by a user, applying a plurality of rules to the plurality of input signals to generate a confidence score, and comparing the confidence score to a threshold score to determine if the plurality of target user-actuatable input components are associated with an approved input device.

14 Claims, 12 Drawing Sheets

(56) References Cited

U.S. PATENT DOCUMENTS

| | | | |
|---|---|---|---|
| 8,509,847 B2 | 8/2013 | Wilson et al. | |
| 8,533,841 B2* | 9/2013 | Kulkarni | G06F 21/552 |
| | | | 726/25 |
| 8,856,542 B2 | 10/2014 | Tatarinov et al. | |
| 9,197,413 B1* | 11/2015 | Hall, III | H04L 9/3215 |
| 2004/0068559 A1 | 4/2004 | Shaw | |
| 2004/0242321 A1* | 12/2004 | Overton | G06F 21/128 |
| | | | 463/29 |
| 2004/0254014 A1* | 12/2004 | Quraishi | G07F 17/3202 |
| | | | 463/29 |
| 2007/0238524 A1* | 10/2007 | Harris | A63F 13/75 |
| | | | 463/42 |
| 2007/0250621 A1* | 10/2007 | Hillier | G06N 5/025 |
| | | | 709/224 |
| 2008/0004107 A1* | 1/2008 | Nguyen | G06Q 10/10 |
| | | | 463/29 |
| 2008/0263636 A1* | 10/2008 | Gusler | G06F 21/316 |
| | | | 726/4 |
| 2008/0305869 A1* | 12/2008 | Konforty | A63F 13/12 |
| | | | 463/29 |
| 2009/0144825 A1* | 6/2009 | Schluessler | G06F 21/53 |
| | | | 726/23 |
| 2011/0006113 A1* | 1/2011 | Uchikura | G06Q 30/06 |
| | | | 235/380 |
| 2011/0154444 A1* | 6/2011 | Sriraghavan | G06F 3/04883 |
| | | | 726/4 |
| 2011/0277030 A1* | 11/2011 | Gillespie | G06F 21/34 |
| | | | 726/17 |
| 2012/0311708 A1* | 12/2012 | Agarwal | G06F 21/55 |
| | | | 726/24 |
| 2013/0052992 A1* | 2/2013 | Lee | G06F 21/52 |
| | | | 455/411 |
| 2013/0110008 A1* | 5/2013 | Bourget | A61B 5/11 |
| | | | 600/595 |
| 2015/0074615 A1* | 3/2015 | Han | G06K 9/00033 |
| | | | 715/863 |
| 2015/0135271 A1* | 5/2015 | Forest | H04L 9/3226 |
| | | | 726/4 |
| 2015/0262067 A1* | 9/2015 | Sridhara | G06N 5/04 |
| | | | 706/12 |
| 2015/0363613 A1* | 12/2015 | O'Dowd | G06F 21/83 |
| | | | 726/23 |
| 2016/0344752 A1* | 11/2016 | Sterne | H04L 63/083 |
| 2017/0092039 A1* | 3/2017 | Borissov | G07F 17/3209 |
| 2017/0180328 A1* | 6/2017 | Loch | H04L 63/0428 |
| 2017/0289184 A1* | 10/2017 | C | H04L 63/1425 |
| 2018/0063716 A1* | 3/2018 | Weigand | H04M 1/72527 |
| 2018/0239889 A1* | 8/2018 | Burrough | G06F 21/44 |
| 2019/0073046 A1* | 3/2019 | Caruana | G06F 3/023 |

OTHER PUBLICATIONS

Merrick, Jordan, "Using Third Party Keyboards and Mice With Your Mac", Retrieved from <<https://computers.tutsplus.com/tutorials/using-third-party-keyboards-and-mice-with-your-mac--mac-44602>>, Jan. 2, 2013, 23 Pages.

Vaas, Lisa, "I am not a robot: Google swaps text CAPTCHAs for quivery mouse clicks", Dec. 5, 2014. 10 pages. Available at: https://nakedsecurity.sophos.com/2014/12/05/i-am-not-a-robot-google-swaps-text-captchas-for-quivery-mouse-clicks/.

* cited by examiner

IDENTIFYING AN INPUT DEVICE

BACKGROUND

Many types of input devices may be used to provide input to computing devices. Some input devices may include a keyboard, mouse or video game controller. Certain input devices may provide an advantage over other input devices that are typically used with a particular computing device, such as a gaming console. In some examples, intermediate devices may allow users to connect these "unapproved" input devices to a particular computing device to gain an advantage over other input devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to computing devices and methods for identifying an approved input device. In one example, a method comprises: receiving a plurality of input signals from a plurality of target user-actuatable input components operated by a user, applying a plurality of rules to the plurality of input signals to generate a confidence score, and comparing the confidence score to a threshold score to determine if the plurality of target user-actuatable input components are associated with an approved input device.

DETAILED DESCRIPTION

Many types of input devices may be used to provide input to computing devices, such as video game consoles. Some input devices may include a keyboard, mouse or video game controller. However, in some examples and with certain computing devices such as gaming consoles, input devices such as keyboards and mice may give users an unfair advantage as compared to other controllers typically used with such computing devices. For example, an intermediate device may allow users to connect unapproved input devices, such as keyboards and mice, to video game consoles. These intermediate devices may modify input signals from the unapproved input devices to resemble input signals from an approved input device.

Figure 1:
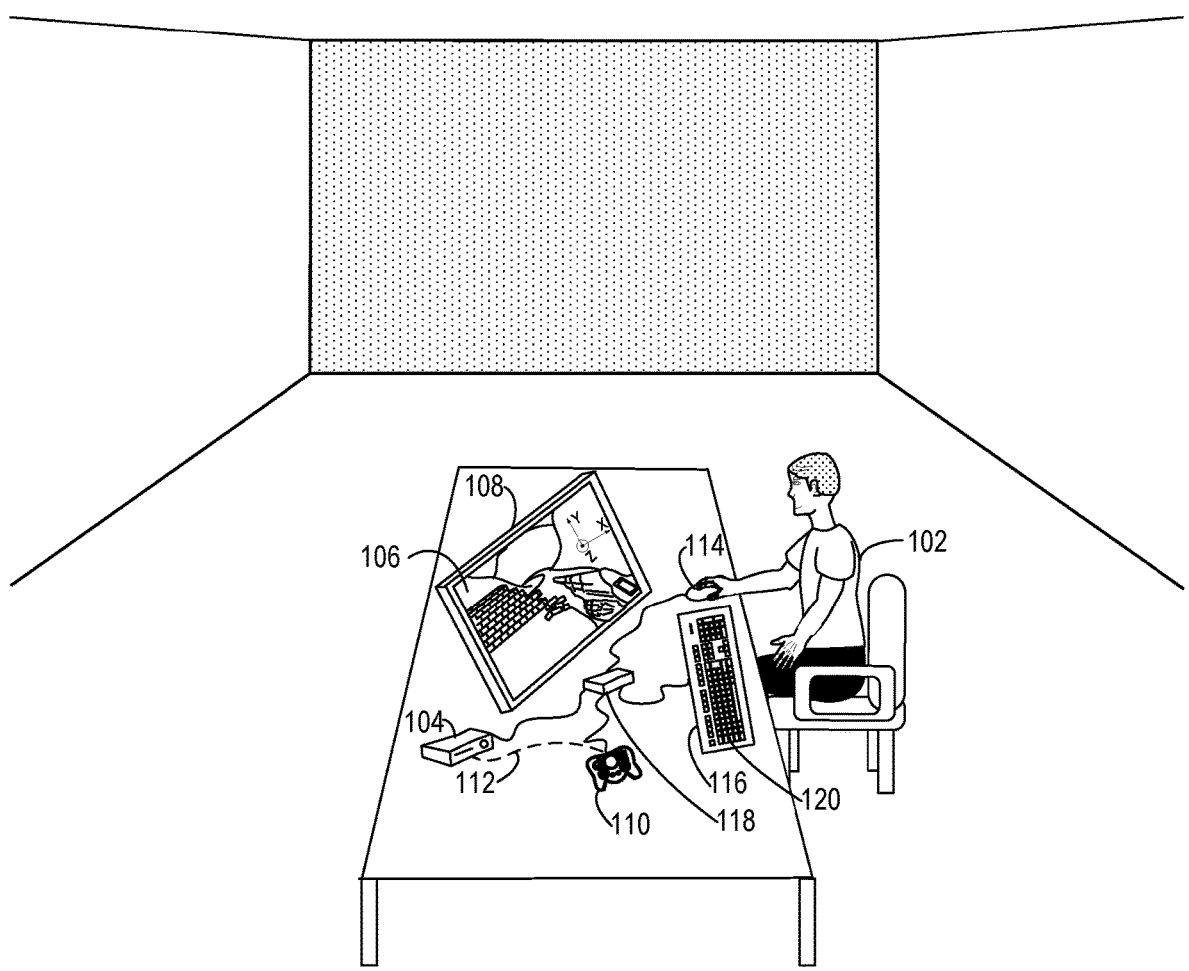
FIG. 1 is an illustrative example of a use case scenario in which a user manipulates target input components according to examples of the present disclosure.

Accordingly, examples are disclosed that relate to computing devices and methods for identifying an approved input device. With reference now to FIG. 1, in one example a user 102 interacts with a computing device in the form of a video game console 104 displaying a video game 106 on a display 108. In a standard configuration, the user 102 interacts with the video game console 104 with an approved input device in the form of a hand-held video game controller 110. The video game controller 110 may be connected directly to the video game console 104 by a wired or wireless connection indicated by dashed line 112. As described in more detail below, the video game controller 110 may comprise a plurality of user-actuatable input components by which a user may interact with a video game, streaming service, or other content provided via the video game console 104.

Figure 2:
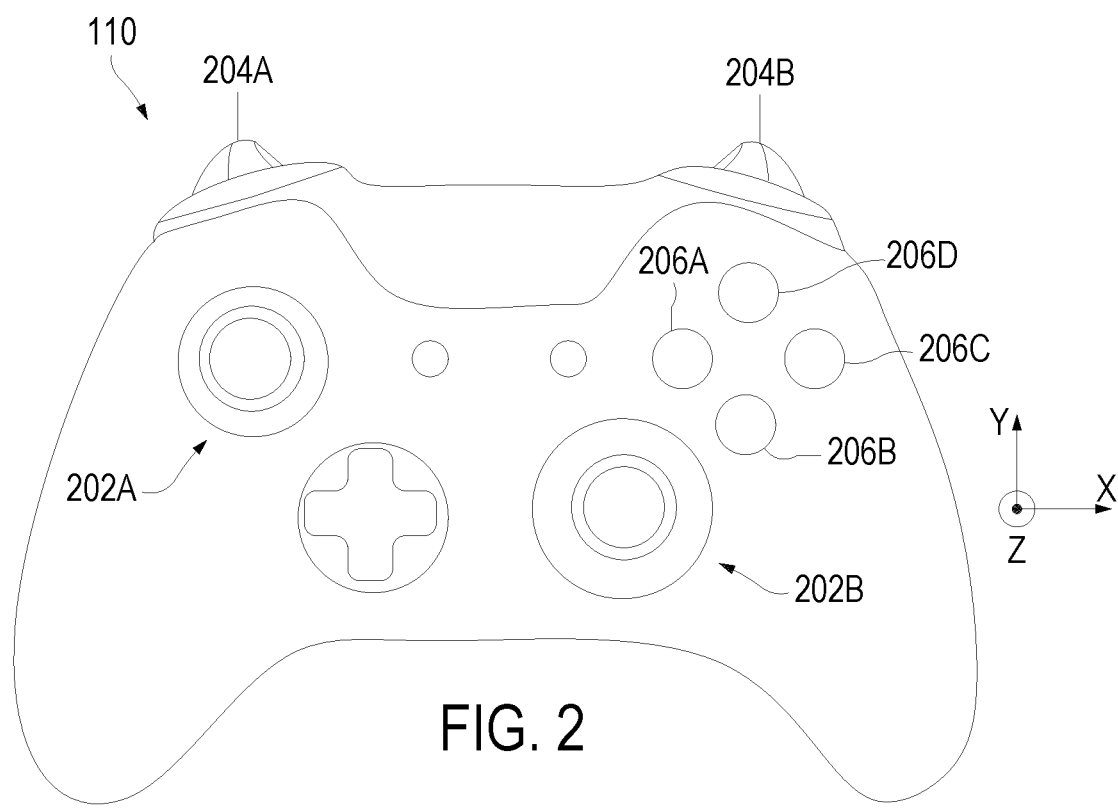
FIG. 2 shows a top-down view of an approved user-actuatable input device including a plurality of user-actuatable input components according to examples of the present disclosure.
Figure 3:
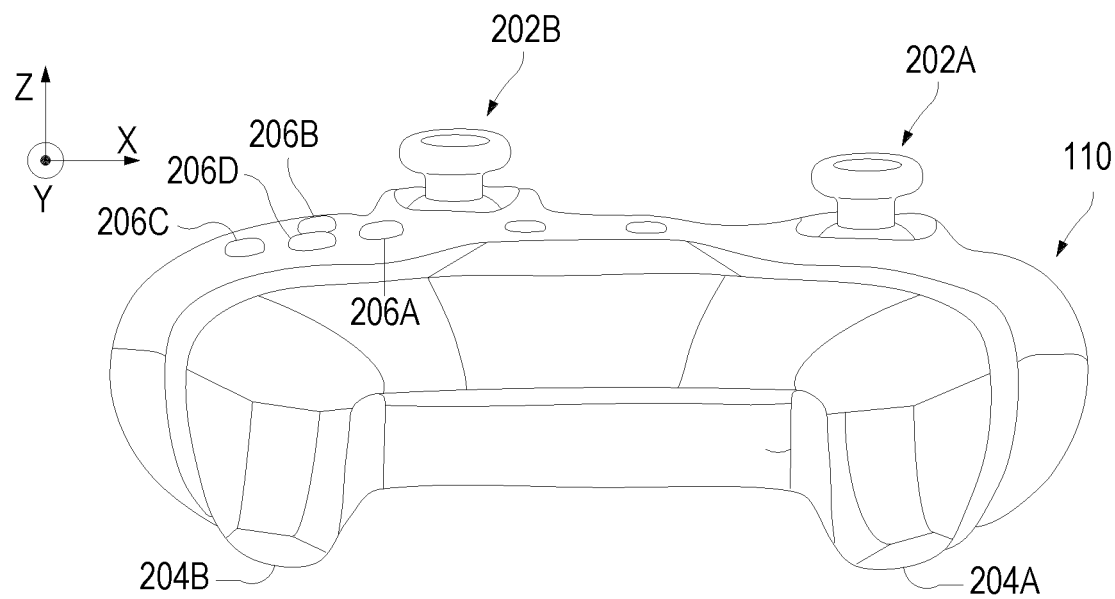
FIG. 3 shows a front-on view of the approved user-actuatable input device of FIG. 2.

With reference now to FIGS. 2 and 3, one example of a video game controller 110 is illustrated. The controller 110 may include user-actuatable input components in the form of a left thumbstick 202A, a right thumbstick 202B, a left trigger 204A, a right trigger 204B, and one or more action buttons 206A, 206B, 206C and 206D. Each of the thumbsticks 202A, 202B is a user-actuatable input component that may be manipulated by a user along two or more axes for controlling or otherwise interacting with a machine, computing device, computer program such as a video game or other application, etc.

In some examples, each of the thumbsticks 202A and 202B may interact with control-activation sensors in the form of potentiometers that use continuous electrical activity to provide an analog input control signal based on a position of the thumbstick relative to a default position. Other examples of control-activation sensors may include dome switches, tactile switches, Hall effect sensors, and other electronic sensing components.

Other user-actuatable input components of the video game controller 110 include the left trigger 204A and right trigger 204B. Each of the triggers 204A, 204B may be manipulated by a user along an axis for controlling or otherwise interacting with a machine, computing device, computer program such as a video game or other application, etc.

In some examples, each of the triggers 204A and 204B may interact with trigger-activation sensors in the form of one or more magnets and one or more Hall effect sensors configured to vary an output signal based on the magnetic field produced by the magnet(s). The magnetic field as detected by the Hall effect sensor may vary based on the relative position and/or orientation of the magnet and the sensor to provide an analog input control signal based on a position of the trigger relative to its default position. Other examples of trigger-activation sensors may include dome switches, tactile switches, potentiometers, and other electronic sensing components.

Additional user-actuatable input components of the video game controller 110 include the action buttons 206A, 206B, 206C and 206D. Each of the action buttons 206A, 206B, 206C and 206D is a user input device component that may be manipulated by a user by being pressed to trigger a binary activation state for controlling or otherwise interacting with a machine, computing device, computer program such as a video game or other application, etc. In some examples, each of the action buttons 206A, 206B, 206C and 206D may interact with trigger-activation sensors in the form of a contact switch or other two-state sensing mechanism that may be used to distinguish between two actuation states (e.g. off/on).

It will be appreciated that the video game controller 110 and user-actuatable input components described above are merely examples provided for illustrative purposes. In other examples, other user input devices comprising different types and/or combinations of user-actuatable input components may be utilized.

With reference again to FIG. 1, in some examples and to gain an advantage over using the approved video game controller 110, the user 102 may interact with the video game console 104 using one or more unapproved input devices. In the example of FIG. 1, such unapproved user input devices are the mouse 114 and keyboard 116. In this example, the mouse 114 and keyboard 116 are connected to an intermediate device 118, which in turn is connected to the video game console 104. The intermediate device 118 may modify input signals from the mouse 114 and/or keyboard 116 to resemble input signals from the approved video game controller 110.

Figure 4:
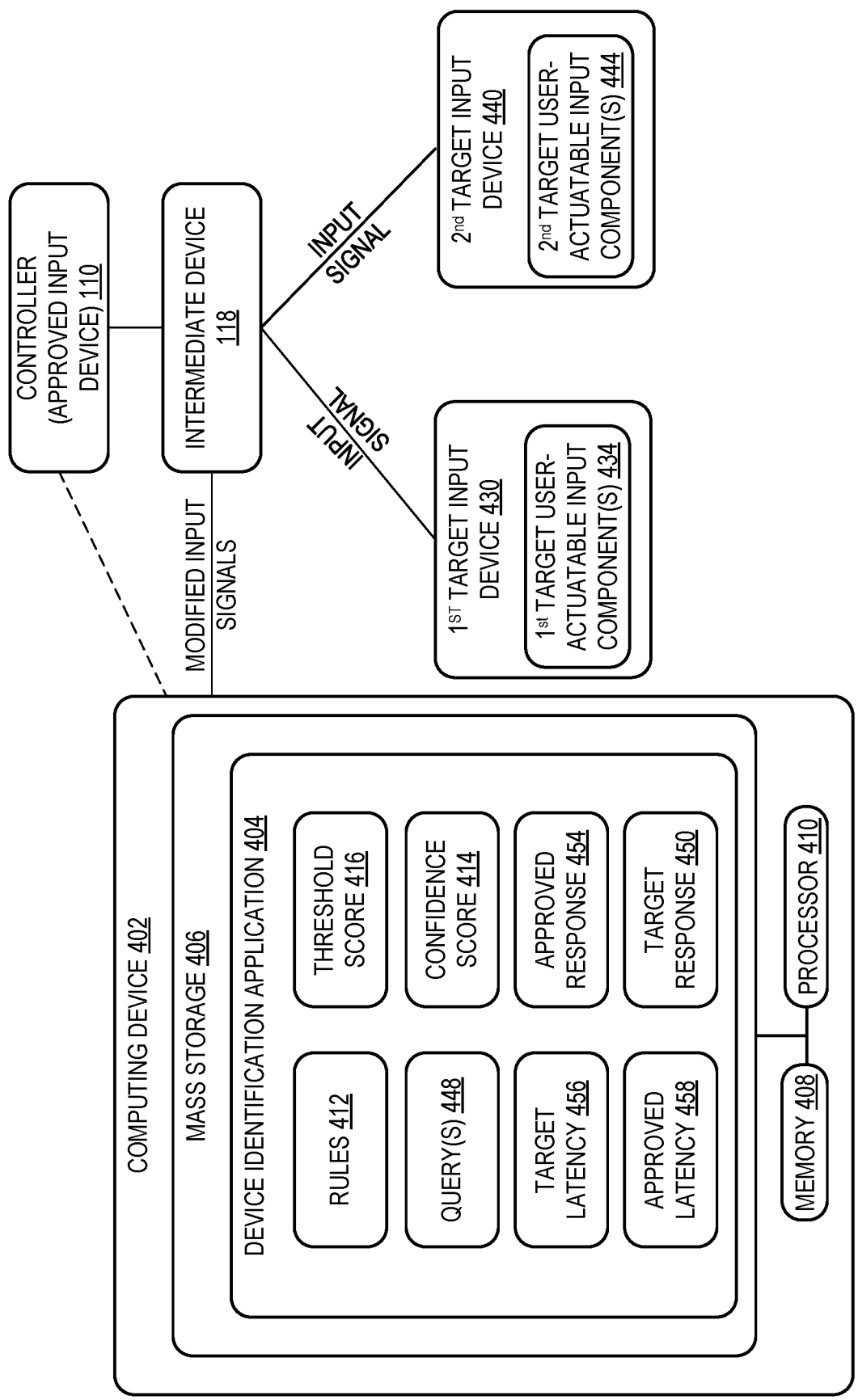
FIG. 4 shows a block diagram illustrating an example system for determining if a plurality of target user-actuatable input components are associated with an approved input device according to examples of the present disclosure.

To identify whether an input device is an approved or unapproved input device, a device identification application may analyze input signals received from one or more target input devices. With reference now to FIG. 4, one example of a computing device 402 comprising a device identification application 404 configured to identify an approved input device is provided. The device identification application 404 comprises instructions that may be stored in mass storage 406, loaded into memory 408 and executed by processor 410 to perform one or more of the methods and processes described herein. Computing device 402 may take the form of video game console 104 in the example of FIG. 1.

As described in more detail below, computing device 402 may receive a plurality of input signals from a plurality of target user-actuatable input components that are operated by a user. The device identification application 404 may apply a plurality of rules 412 to the plurality of input signals to generate a confidence score 414. The device identification application 404 then may compare the confidence score 414 to a threshold score 416 to determine if the plurality of target user-actuatable input components are associated with an approved input device.

Each of the target user-actuatable input components are associated with a corresponding target input device. In the example of FIG. 4, a first target input device 430 comprising one or more first target user-actuatable input components 434 and a second target input device 440 comprising one or more second target user-actuatable input components 444 are shown. In some examples, the target user-actuatable input components may comprise thumbsticks, buttons, triggers, and/or other input components of an approved input device, such as controller 110. In other examples, the target user-actuatable input components may comprise input components of an unapproved input device, such as a keyboard or a mouse.

In the example of FIG. 1, the plurality of target input devices comprise mouse 114 and keyboard 116. The keyboard 116 comprises a plurality of target user-actuatable input components in the form of keys 120. In some examples, four keys 120 may be grouped together by intermediate device 118 to spoof the four directions of motion of a single user-actuatable user input component, such as a thumbstick. For example, where keyboard 116 is a QWERTY keyboard, keys 120 representing letters W, A, S and D may provide input signals corresponding to the +Y, −X, −Y and +X directions, respectively, on display 108 that are typically generated by the left thumbstick 202A of video game controller 110.

Mouse 114 may comprise a tracking system, such as an optical or mechanical tracking system, that detects two-dimensional motion of the mouse relative to a surface. For purposes of the present disclosure, the tracking system may comprise a target user-actuatable input component that tracks motion of mouse 114 along a first axis and a second axis that is orthogonal to the first axis. In this manner, the user 102 may manipulate the mouse to provide input signals corresponding to the +Y, −X, −Y and +X directions on display 108 that are typically generated by the right thumbstick 130B of video game controller 110. Mouse 114 also may comprise user-actuatable input components such as one or more buttons that may be pressed to trigger a binary activation state to provide input signals that are typically generated by the triggers 204 of video game controller 110.

Figure 5:
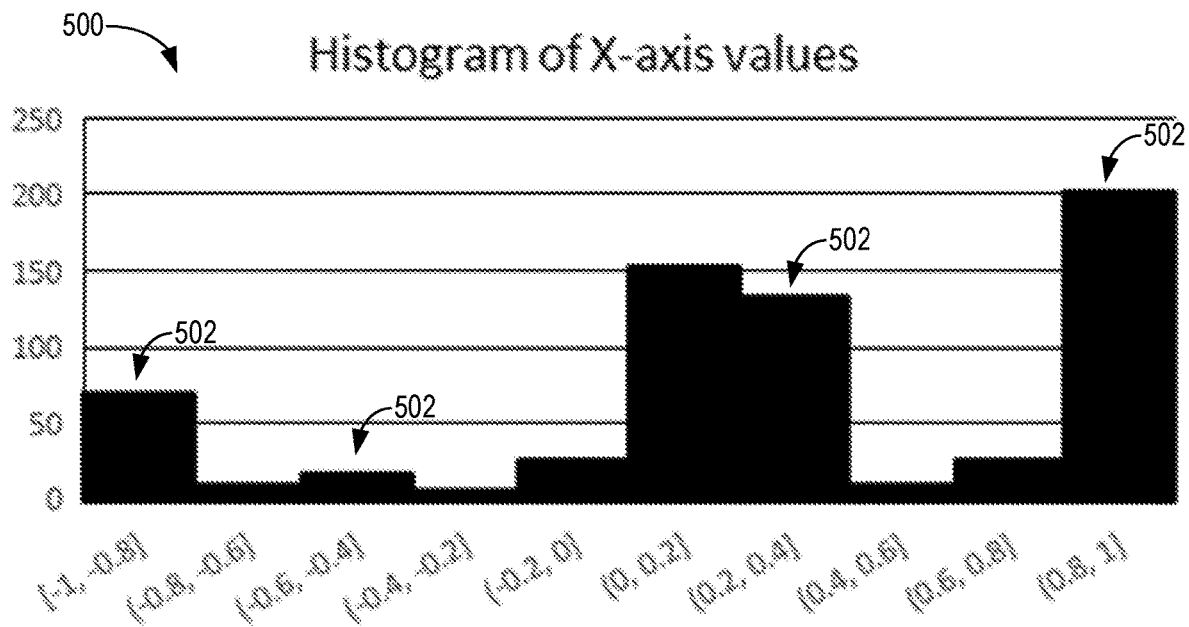
FIG. 5 shows an example of the x-coordinates of portions of an input signal associated with an approved user-actuatable input component according to examples of the present disclosure.

Examples of rules 412 that may be utilized to generate the confidence score 414 will now be described. With reference now to FIG. 5, rules 412 may include assigning portions of at least one input signal to one or more of a plurality of position bins of a histogram, wherein each of the position bins corresponds to a different analog position of an approved user-actuatable component of the approved input device.

In the example of FIG. 5, histogram 500 illustrates x-axis positions of an analog user-actuatable input component, such as the left thumbstick 202A of the controller 110, captured over a capture period. In this example, the histogram 500 comprises 10 position bins 502 along a horizontal axis that each represent a range of x-axis values generated by the input component. In other examples, any suitable number of position bins 502 may be utilized. Each position bin 502 has a width of 0.2 and the x-axis values range from −1.0 to +1.0. In other examples, the position bins 502 may have any other suitable widths and other ranges of x-axis values may be represented.

The vertical axis value of each position bin 502 of the histogram 500 represents a magnitude or number of inputs for that bin. In different examples, the capture period may be defined by a number of inputs received from the input component, such as 100, 1000, 2000, 5000, or other number of inputs. In other examples, the capture period may comprise a period of time during which signals are received from the input device, such as 30 seconds, 1 minute, 5 minutes, 10 minutes, or other period of time.

Figure 6:
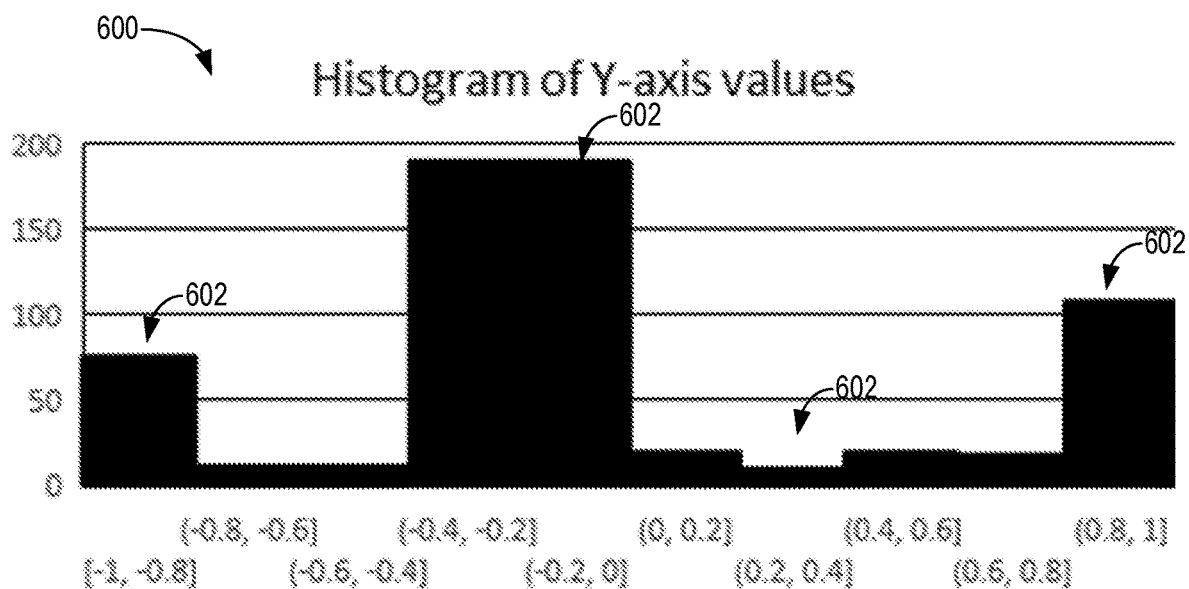
FIG. 6 shows an example of the y-coordinates of portions of an input signal associated with an approved user-actuatable input component according to examples of the present disclosure.

In a similar manner, FIG. 6. shows a histogram 600 that illustrates y-axis positions of the same analog user-actuatable input component captured over the capture period of time. In this example and like histogram 500, the histogram 600 comprises 10 position bins 602 along a horizontal axis that each represent a range of y-axis values. Each position bin 602 has a width of 0.2 and the y-axis values range from −1.0 to +1.0. In other examples, any suitable number of position bins may be utilized, the position bins 602 may have any other suitable widths, and other ranges of y-axis values may be utilized.

As these two histograms illustrate, over the capture period each of the position bins 502, 602 receives one or more inputs corresponding to an x-axis or y-axis position of the approved user-actuatable component of the approved input device. Accordingly, none of the position bins 502, 602 contains a zero value.

Figure 7:
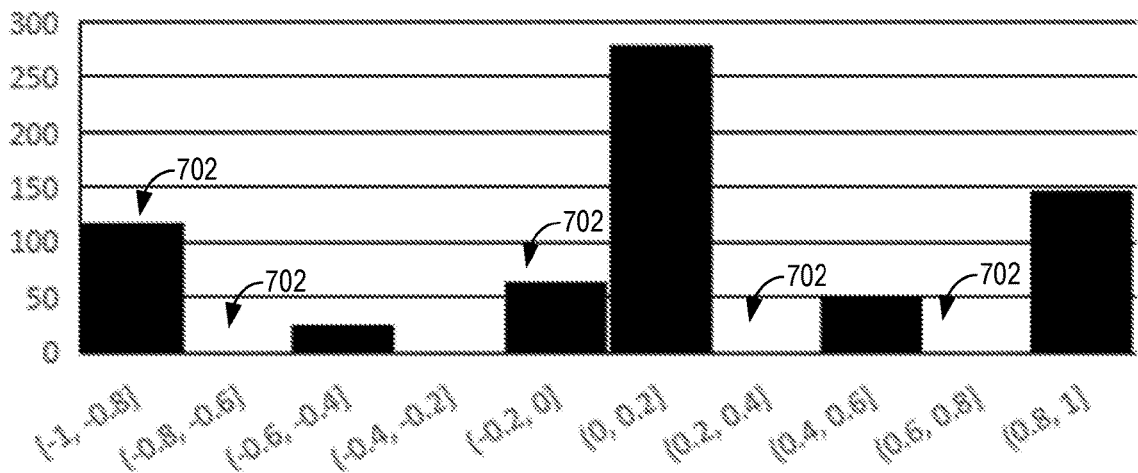
FIG. 7 shows an example of the x-coordinates of portions of an input signal associated with an unapproved user-actuatable input component according to examples of the present disclosure.
Figure 8:
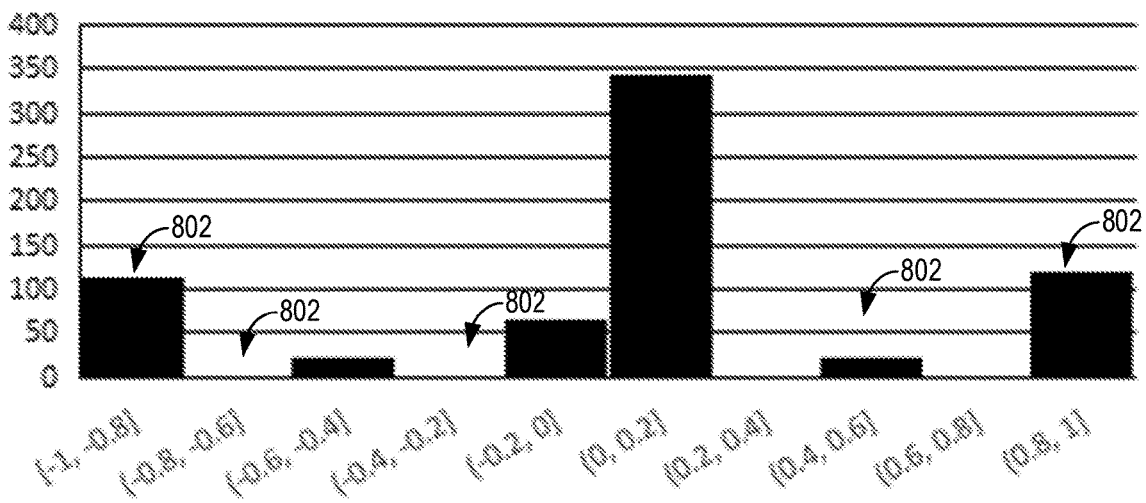
FIG. 8 shows an example of the y-coordinates of portions of an input signal associated with an unapproved user-actuatable input component according to examples of the present disclosure.

With reference now to FIGS. 7 and 8, histograms 700 and 800 illustrate a portion of an input signal received from an unapproved user-input device. In this example, the unapproved user-input device comprises keyboard 116 and the target user-actuatable input components comprise keys 120 of the keyboard. As noted above, the keyboard 116 may be connected to an intermediate device 118 that may modify keyboard input signals to resemble input signals from the controller 110.

In the example of FIG. 7 and like histogram 500, histogram 700 represents x-axis positions and comprises 10 position bins 702 that each represent a range of x-axis values generated by the keys 120 of the keyboard 116. In this example, the number of position bins and range of x-axis values are the same as in histogram 500. In other examples, the number of position bins and/or the range of x-axis values may be different.

Similarly, in the example of FIG. 8 and like histogram 600, histogram 800 represents y-axis positions and comprises 10 position bins 802 that each represent a range of y-axis values generated by the keys 120 of the keyboard 116. In this example, the number of position bins and range of y-axis values are the same as in histogram 600. In other examples, the number of position bins and/or the range of y-axis values may be different.

In both histograms 700 and 800, at least one of the position bins 702, 802 contains a zero value. This may occur when a key 120, which provide a binary (e.g. on/off) signal, is used to spoof the analog input signal typically generated by a thumbstick 202 of a video game controller 110. As a result, the input signal from key 120 may skip over intermediate values to reach a set value.

Accordingly, one of the plurality of rules 412 applied to generate the confidence score 414 may include, for a histogram of x-axis or y-axis values as described above, determining whether any position bin contains a zero value. Where at least one of the position bins contains a zero value, the device identification application 404 may adjust the confidence score to indicate a lower likelihood that the target user-actuatable input components are associated with an approved input device.

Figure 9:
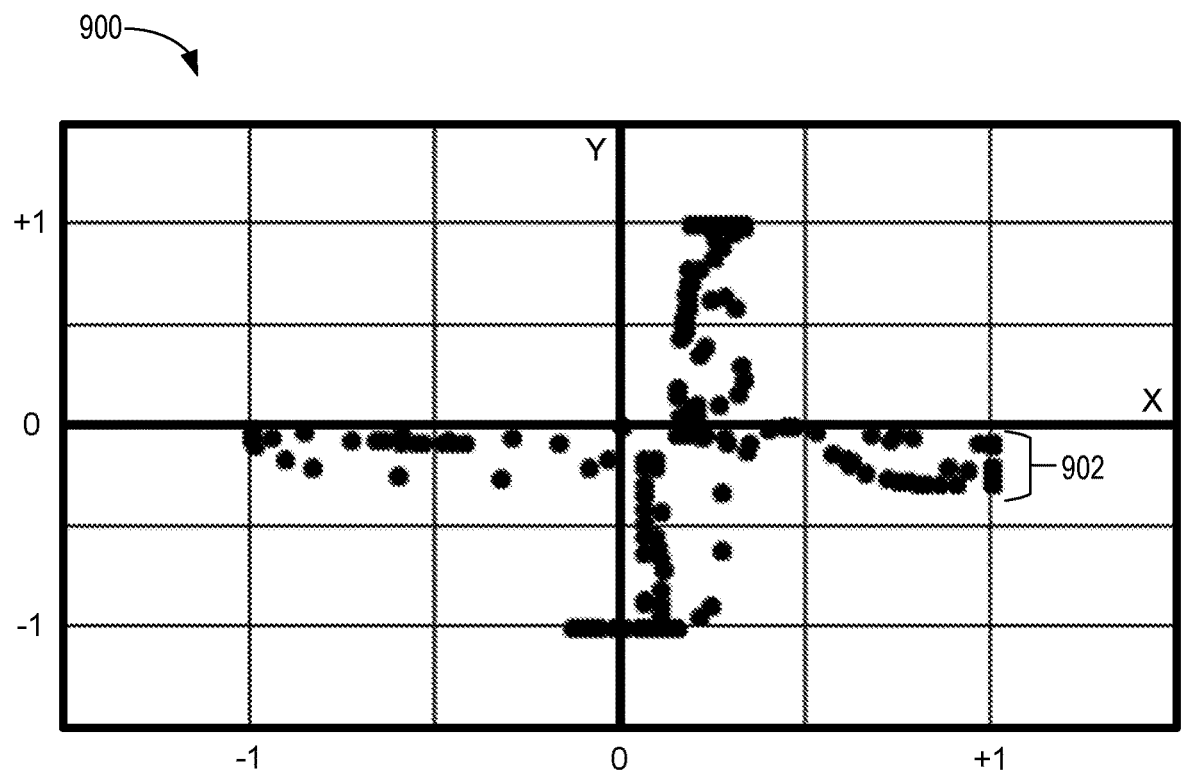
FIG. 9 shows an example plot of positions of an approved user-actuatable input component according to examples of the present disclosure.
Figure 10:
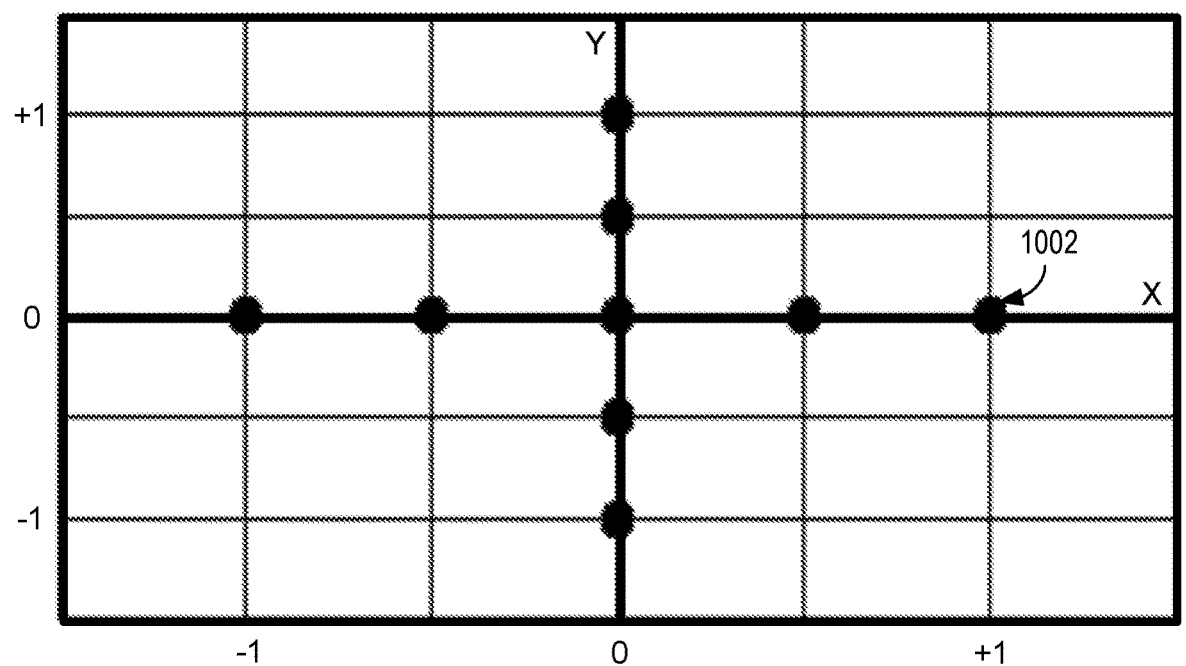
FIG. 10 shows an example plot of positions of an unapproved user input device according to examples of the present disclosure.

With reference now to FIGS. 9 and 10, the rules 412 that are applied to generate the confidence score 414 may include identifying an extremum value along a first axis in a portion of an input signal, and determining whether the portion of the input signal also includes a non-zero value along a second axis that is orthogonal to the first axis. In the example of FIG. 9, plot 900 illustrates a plurality of points that correspond to the positions of an analog user-actuatable input component of an approved input device, such as the left thumbstick 202A of the controller 110, captured over a capture period. As described above, the capture period may comprise a number of inputs or a period of time in which input signals are received.

As plot 900 illustrates, over the capture period computing device 402 receives a plurality of inputs in the input signal that correspond to the x-axis and y-axis positions of the left thumbstick 202A. In plot 900, some of the captured points reach an extremum value, which in this example is +1.0 or −1.0 along an axis. For example, a grouping 902 of points are each located at the maximum value of +1.0 along the x-axis. For clarity, each of the points in the grouping 902 represents a portion of the input signal from the analog user-actuatable input component of the approved input device.

As shown in FIG. 9, each of the points in the grouping 902 of points at +1.0 along the x-axis includes a non-zero coordinate along the orthogonal y-axis. In some examples, this may occur when an approved user-actuatable component provides an analog input control signal based on a position of the component in at least two axes relative to its default position. In the example of the thumbstick 202A, manipulating the thumbstick 202A to a maximum on any one axis often results in at least a small amount of motion about the orthogonal axis, as illustrated in FIG. 9.

With reference now to FIG. 10, plot 1000 illustrates a portion of an input signal received from an unapproved user-input device. In this example, the unapproved user-input device comprises keyboard 116 and the target user-actuatable input components comprise keys 120 of the keyboard. As noted above, the keyboard 116 may be connected to an intermediate device 118 that may modify keyboard input signals to resemble input signals from the controller 110.

In the example of FIG. 10, plot 1000 represents x-axis and y-axis input coordinates generated by the keys 120 of the keyboard 116. In this example, the range of x-axis and y-axis values are the same as in plot 900, with an extremum value along either axis of +1.0 or −1.0. In other examples, the ranges of x-axis and y-axis values may be different.

In FIG. 10, grouping 1002 represents a plurality of points located at the maximum value of +1.0 along the x-axis. Unlike the grouping 902 of points in FIG. 9, however, each of the points in grouping 1002 has a zero coordinate along the y-axis. This may occur when a key 120, which provide a binary (e.g. on/off) signal, is used to spoof an extremum value along one axis of an input control signal. In such examples, the input signal from one key may be mapped to the maximum value along a first axis and a zero value along an orthogonal second axis (e.g., (1.0, 0)). In some examples and as noted above, four keys of a keyboard may be mapped to four extremum values along orthogonal axes (e.g., (1.0, 0), (−1.0, 0), (0, 1.0) and (0, −1.0)). In the example of FIG.

10, a modifier input is also illustrated that may selectively downscale the input of a key by 50% (e.g., (0.5, 0).

Accordingly, one of the plurality of rules 412 applied to generate the confidence score 414 may include, for a plot of x-axis and y-axis values of a portion of an input signal as described above, identifying an extremum value along a first axis in a portion of the input signal, and determining whether this portion of the input signal also includes a non-zero value along a second axis that is orthogonal to the first axis. Where at least one of the axes of the plot contains an extremum value along a first axis in a portion of the input signal (such as one or more input signal samples), and this portion of the input signal does not include a non-zero value along a second axis that is orthogonal to the first axis, the device identification application 404 may adjust the confidence score to indicate a lower likelihood that the target user-actuatable input components are associated with the approved input device.

Figure 11:
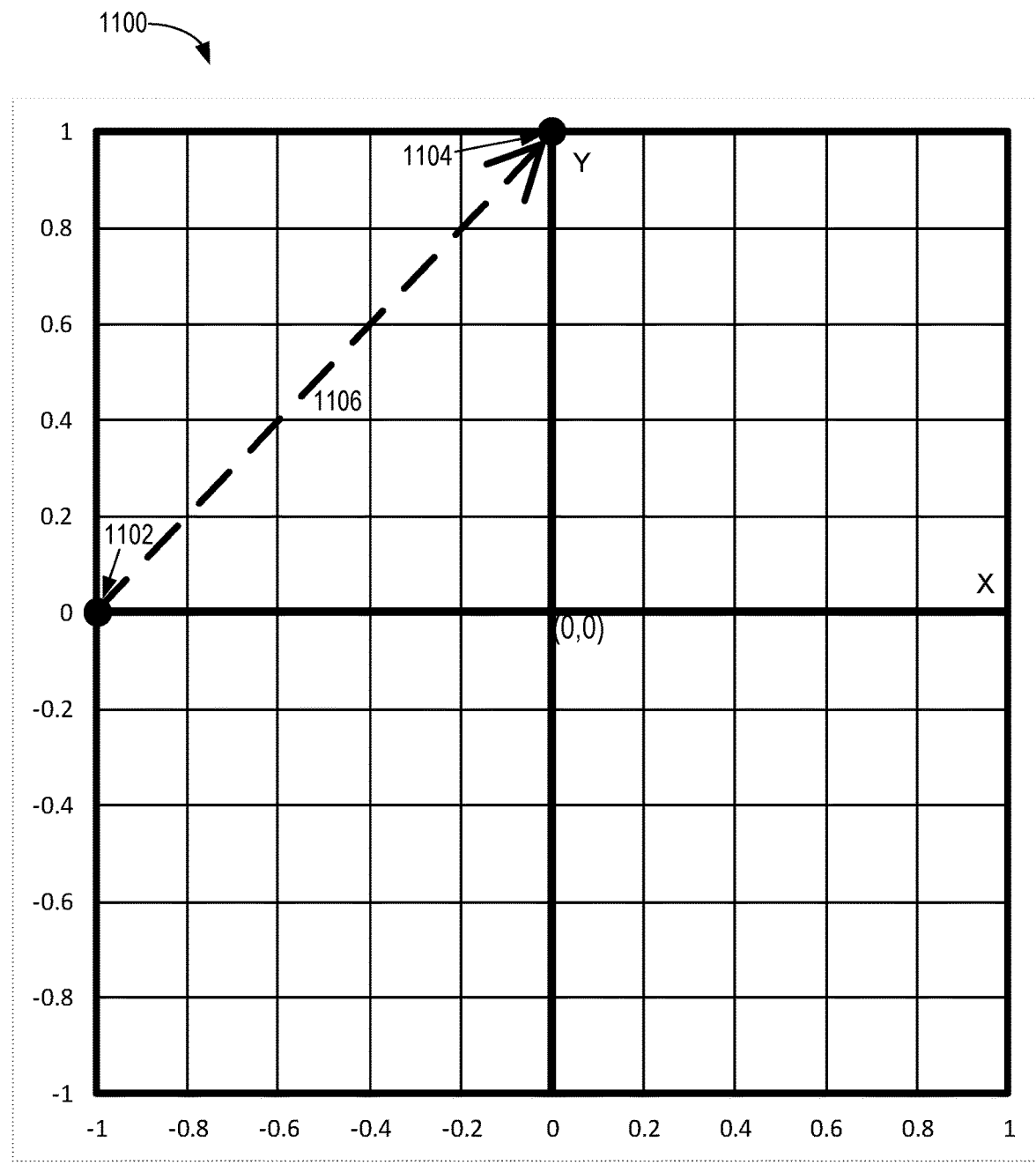
FIG. 11 illustrates a first-sampled portion of an input signal and a second-sampled portion of the input signal sampled immediately after the first-sampled portion according to examples of the present disclosure.

With reference now to FIG. 11, the rules 412 that are applied to generate the confidence score 414 may also include identifying an extremum value along a first axis in a first-sampled portion of the input signal, and identifying an extremum value along a second axis orthogonal to the first axis in a second-sampled portion of the input signal that is sampled immediately after the first-sampled portion. In the example of FIG. 11, plot 1100 illustrates a first-sampled portion 1102 of the input signal and a second-sampled portion 1104 of the input signal that is sampled immediately after the first-sampled portion.

As illustrated by example in FIG. 11, the first-sampled portion 1102 represents an extremum value (−1.0) along the x-axis, while the second-sampled portion 1104 represents an extremum value (+1.0) along the y-axis orthogonal to the x-axis. As indicated by dashed arrow 1106, portion 1104 is sampled immediately after portion 1102.

In some examples, this pattern of a first extremum being immediately followed by a second extremum may occur when two or more keys of a keyboard are mapped to different extremum values along orthogonal axes (e.g., (1.0, 0), (−1.0, 0)). In these examples, when a user presses one key followed by a different key, the corresponding input signal will register a first extremum value followed by a second, different extremum value. As a result, and unlike the input signal from an analog user-actuatable input component of an approved input device, the input signal from these keys will not present any intermediate values between registering an extremum on one axis and registering an extremum on a second, orthogonal axis immediately afterward.

Accordingly, one of the plurality of rules 412 applied to generate the confidence score 414 may include identifying an extremum value along a first axis in a first-sampled portion of the input signal, and identifying an extremum value along a second axis orthogonal to the first axis in a second-sampled portion of the input signal that is sampled immediately after the first-sampled portion. Where an extremum value is identified along a first axis in a first-sampled portion of the input signal, and an extremum value is identified along a second axis orthogonal to the first axis in second-sampled portion of the input signal that is sampled immediately after the first-sampled portion, the device identification application 404 may adjust the confidence score to indicate a lower likelihood that the target user-actuatable input components are associated with the approved input device.

In another example, the rules 412 that are applied to generate the confidence score 414 may also include determining a target latency 456 between a first input signal corresponding to a first target user-actuatable input component and a second input signal corresponding to a second target user-actuatable input component, and comparing the target latency to an approved latency 458 between input signals received from two approved user-actuatable input components of an approved input device.

In one example, a first approved user-actuatable input component may be the right thumbstick 202B, illustrated in FIGS. 2 and 3. A second approved user-actuatable input component may be one of action buttons 206, such as button 206B. When a user switches from using her right thumb to actuate the right thumbstick 202B to using her thumb to press button 206B, the latency between these two input signals may be defined as an approved latency 458. The approved latency may be a specific value, a minimum threshold, or may be a range of approved values. In one example, the specific value may be 0.2 seconds, the minimum threshold may be at least 0.2 seconds, and the range of approved values may be between 0.15 and 0.4 seconds. Other examples of suitable values, thresholds and ranges may be utilized.

An unapproved input device, keyboard 116 for example, may have user-actuatable input components, such as keys 120, configured to spoof the input signals typically generated by two approved user-actuatable input components. The configuration of such unapproved user-actuatable input components may provide users with an advantage, such as lower latency between consecutive activations of two such components. In other words, a user can consecutively press two keys 120 on keyboard 116 faster than a user can actuate the right thumbstick 202B using her thumb followed by using the same thumb to press button 206B.

Accordingly, where the target latency 456 between a first input signal corresponding to a first target user-actuatable input component and a second input signal corresponding to a second target user-actuatable input component does not match an approved latency 458, the device identification application 404 may adjust the confidence score to indicate a lower likelihood that the target user-actuatable input components are associated with an approved input device.

The rules 412 that are applied to generate the confidence score 414 may also include sending a query 448 to a target input device associated with one or more of the target user-actuatable input components, and determining if a target response 450 to the query matches an approved response 454 associated with the approved input device. For example, communication between computing device 402 and approved input device 110 may be interrupted when controller 110 is connected to the computing device 402 through intermediate device 118. Packets sent from computing device 402 may be dropped or blocked from reaching approved input device 110 by intermediate device 118. In other examples, commands such as firmware updates to the approved input device 110 may not be completed if the approved input device is connected to computing device 402 through intermediate device 118.

Accordingly, where a target input device responds to a query in a manner that does not match an approved response associated with an approved input device, the device identification application 404 may adjust the confidence score to indicate a lower likelihood that the target user-actuatable input components are associated with an approved input device.

As previously discussed, an unapproved user input device may not respond to queries 448 from computing device 402 in the same manner as an approved user input device 110. Accordingly, the rules 412 that are applied to generate the confidence score 414 may also include sending a plurality of queries 448 in one packet to a target input device associated with the target user-actuatable input components, and determining if a target response from the target input device matches an approved response associated with the approved input device.

An approved user input device may respond to a plurality of queries regardless of whether they are received in one or more packets. However, when approved input device 110 is connected to computing device 402 via intermediate device 118, the intermediate device 118 may not relay the queries or response properly between approved input device 110 and computing device 402. Additionally, an unapproved user input device may not have the capacity to respond to a plurality of queries in one packet in the same manner as an approved user input device.

Accordingly, where a target input device associated with one or more of the target user-actuatable input components responds to a plurality of queries sent in one packet in a manner that does not match an approved response associated with an approved input device, the device identification application 404 may adjust the confidence score to indicate a lower likelihood that the target user-actuatable input components are associated with the approved input device.

The rules 412 that are applied to generate the confidence score 414 may also include monitoring current drawn from the computing device 402 by a target input device associated with the target user-actuatable input components, and comparing the current to an approved current to determine if the plurality of target user-actuatable input components are associated with the approved input device. An approved current may be associated with an approved input device 110. The approved current may be a specific value, a minimum or maximum threshold, or may be a range of approved values.

In one example of an approved input device 110, a video game controller 110 receives current through a wired connection to computing device 402. When the controller 110 is connected to intermediate device 118, it may receive current through the intermediate device 118, which may limit or otherwise reduce the overall current drawn from computing device 402 to intermediate device 118. In other examples, intermediate device 118 may draw additional current, on top of that required to power the controller 110, from computing device 402.

In some examples, the controller 110 may be expected to draw more current than normal, such as when electric motors within controller 110 are activated to provide haptic feedback to a user. In these examples, the approved current may be defined as a threshold current corresponding to the current drawn by approved controller 110 when it provides such haptic feedback. A target input device in the form of an unapproved input device, such as a keyboard 116, may not have an electric motor configured to provide haptic feedback. Accordingly, when the keyboard 116 is prompted to provide haptic feedback, the device may not respond by drawing more current from computing device 402, and the actual current drawn may be less than the approved, threshold current.

Accordingly, where the current drawn from the computing device 402 by a target input device associated with the target user-actuatable input components does not match an approved current, the device identification application 404 may adjust the confidence score to indicate a lower likelihood that the target user-actuatable input components are associated with the approved input device.

With reference now to FIGS. 12-15, the rules 412 that are applied to generate the confidence score 414 may also include comparing representations of at least two of the plurality of input signals, wherein each of the representations corresponds to a movement pattern of the target user-actuatable input component generating the corresponding input signal, and determining whether the representations are asymmetrical. For example and with reference to controller 110, the underlying hardware and electrical/mechanical configuration of both the left thumbstick 202A and right thumbstick 202B may be the same or substantially the same. Accordingly and over a capture period, the patterns of movement of each thumbstick may exhibit one or more symmetries. For example, over the capture period each thumbstick may be moved to a maximum position and a minimum position along an axis.

In some examples of unapproved input devices, the target user-actuatable input components generating input signals corresponding to the left and right thumbsticks may have different underlying hardware and/or electrical/mechanical configurations. For example, the hardware and electrical/mechanical configuration of keys 120 of keyboard 116 that may be used to spoof the movements of one thumbstick are quite different from the hardware and electrical/mechanical configuration of a tracking system of mouse 114 that may be used to spoof the movements of the other thumbstick.

Figure 12:
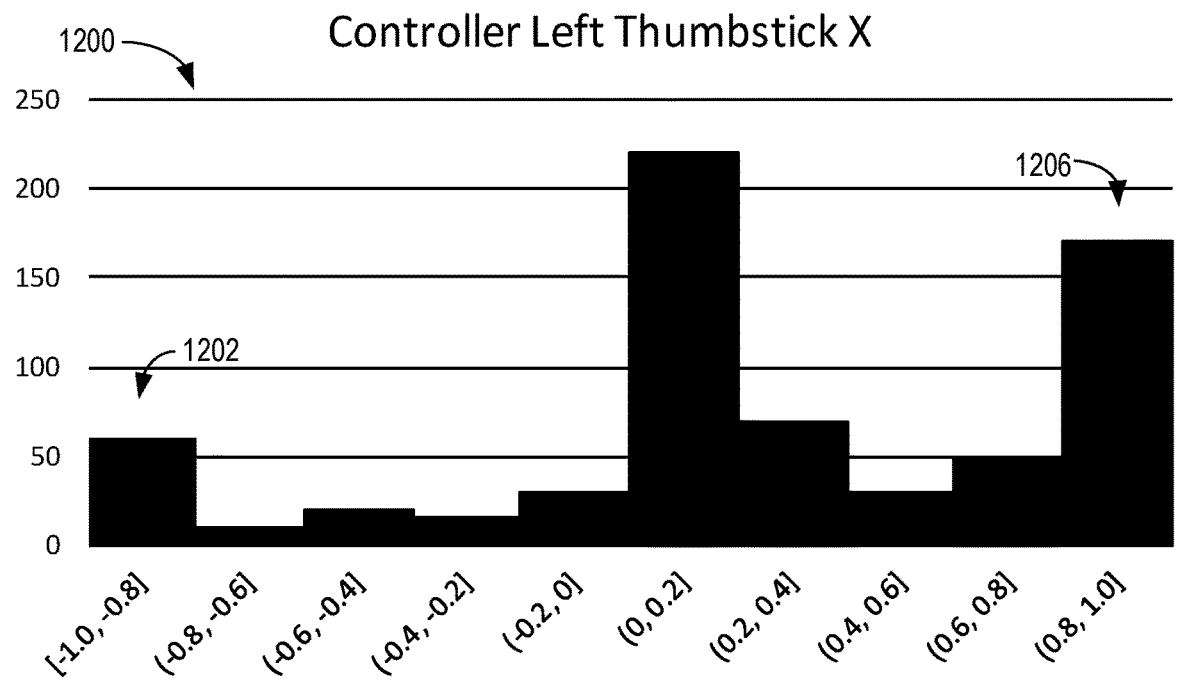
FIGS. 12 and 13 show representations of movement patterns of two approved user-actuatable components according to examples of the present disclosure.

In the example of FIG. 12, histogram 1200 is a representation of an input signal that illustrates a plurality of positions corresponding to the x-axis positions of an analog user-actuatable input component (in this example, the left thumbstick 202A of the controller 110), captured over a capture period. In this manner, histogram 1200 corresponds to a movement pattern of the left thumbstick 202A over the capture period. In this example, the histogram 1200 comprises 10 position bins along a horizontal axis that each represent a range of x-axis values generated by the left thumbstick 202A. In other examples, any suitable number of position bins may be utilized.

In this example, each position bin has a width of 0.2 and the x-axis values range from −1.0 to +1.0. In other examples, the position bins may have any other suitable widths and other ranges of x-axis values may be utilized. The vertical axis value of each position bin of the histogram 1200 represents a magnitude or number of inputs for that bin. As shown in FIG. 12, the minimum position bin 1202 and the maximum position bin 1206 each have values greater than zero. In other words, over the capture period the left thumbstick 202A is manipulated to reach the minimum and maximum x-axis values. Additionally, each of the middle 8 position bins between the minimum position bin 1202 and the maximum position bin 1206 has values greater than zero, which may suggest that a thumbstick generated these values.

Figure 13:
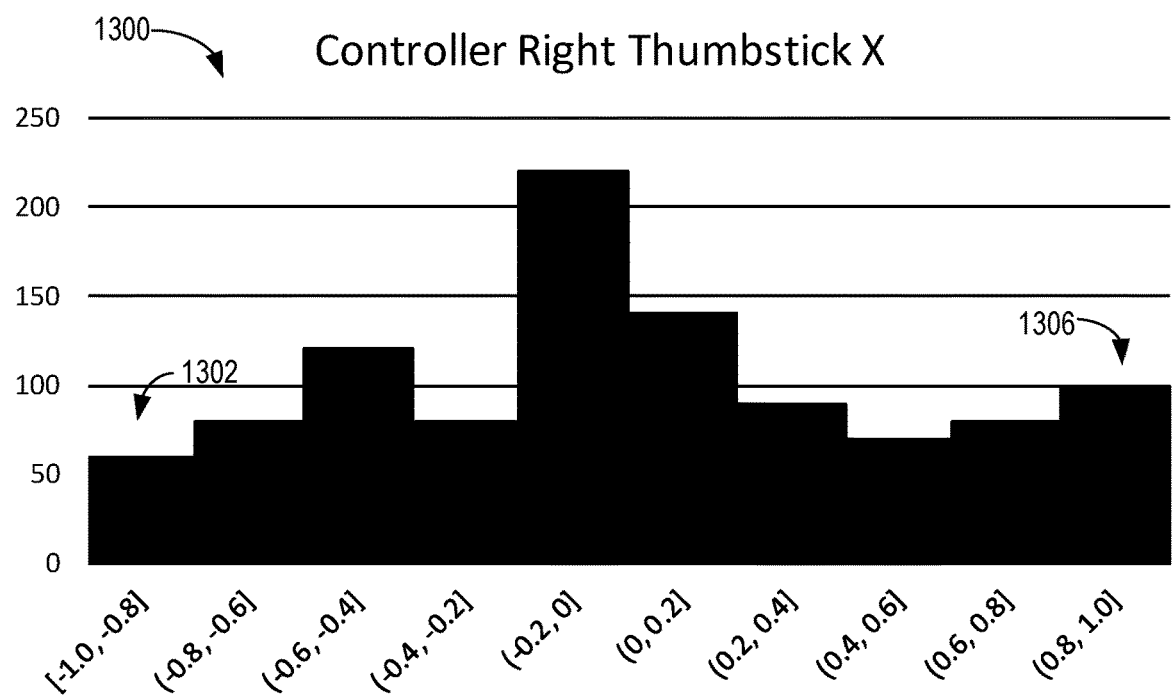

In a similar manner, FIG. 13 shows a histogram 1300 that is a representation of an input signal that illustrates positions corresponding to x-axis positions of a second analog user-actuatable input component (in this case, the right thumbstick 202B of controller 110) captured over the capture period. In this example and like histogram 1200, the histogram 1300 comprises 10 position bins along a horizontal axis that each represent a range of x-axis values generated by the right thumbstick 202B. Each position bin has a width of 0.2 and the x-axis values range from −1.0 to +1.0. The vertical axis value of each position bin of the histogram 1300 represents a magnitude or number of inputs for that bin.

Like histogram 1200, histogram 1300 has values greater than zero in both the minimum position bin 1302 and the maximum position bin 1306. Accordingly, in one example where symmetry comprises having values greater than zero in both minimum and maximum positions of input signal representations, the histograms 1200 and 1300 may be determined to be symmetrical.

Also like histogram 1200, histogram 1300 has non-zero values in each of the middle 8 position bins between minimum position bin 1302 and maximum position bin 1306. Accordingly, in another example where symmetry comprises having non-zero values populated in all position bins between minimum and maximum position bins, the histograms 1200 and 1300 may be determined to be symmetrical. In other examples, representations of two input signals may be determined to be symmetrical where both representations (1) have values greater than zero in both minimum and maximum positions, and (2) have non-zero values populated in all position bins between the minimum and maximum position bins. It will also be appreciated that the above examples of symmetry between representations are provided for illustrative purposes, and that other characteristics of signal representations may be used to define symmetrical representations.

Figure 14:
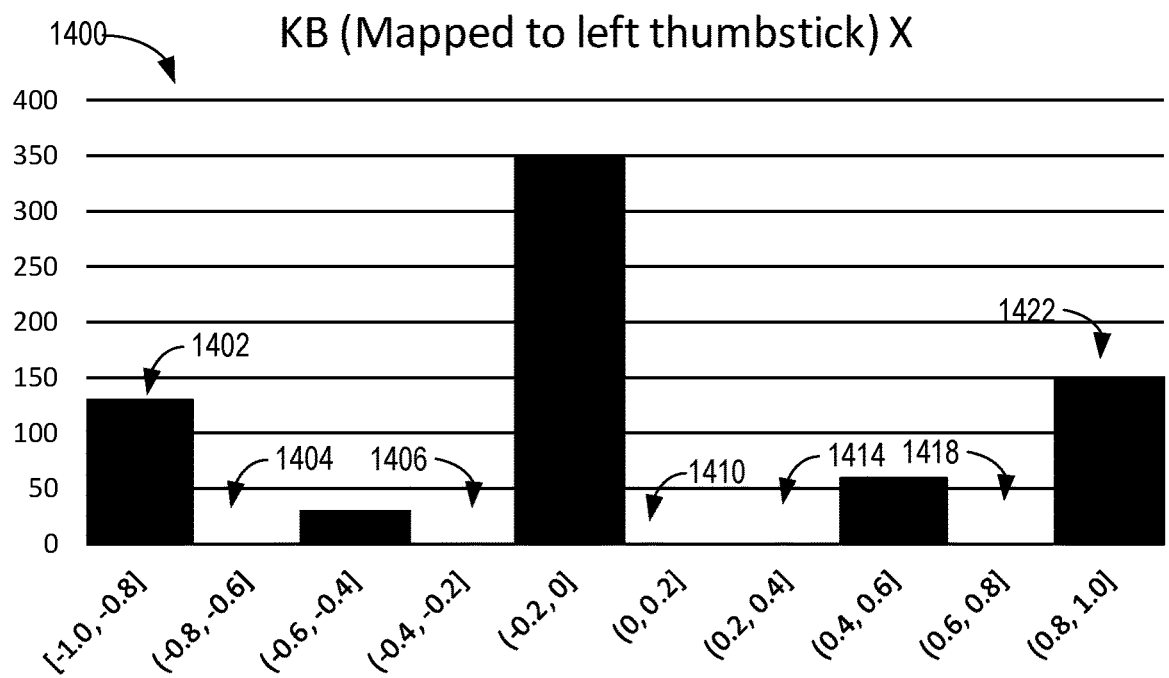
FIGS. 14 and 15 show representations of movement patterns of two target user-actuatable input components according to examples of the present disclosure.
Figure 15:
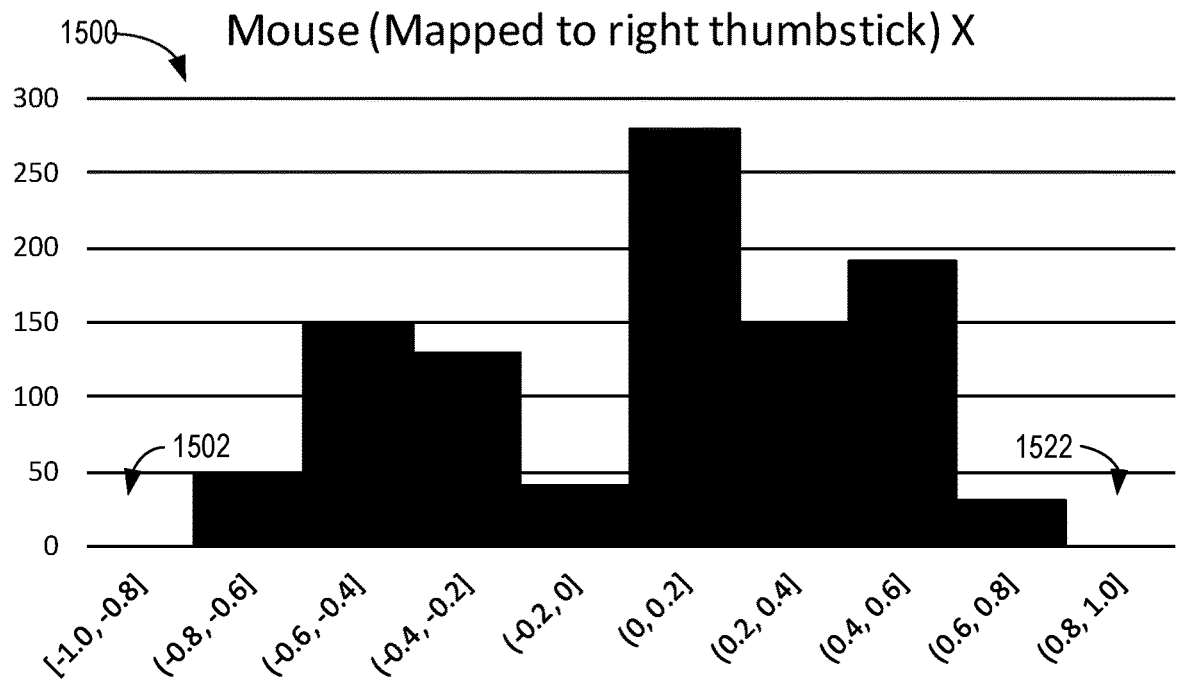

With reference now to FIGS. 14 and 15, histograms 1400 and 1500 are representations of a portion of an input signal received from an unapproved user-input device. In the example of FIG. 14, the unapproved user-input device comprises keyboard 116 and the target user-actuatable input components comprise keys 120 of the keyboard. In the example of FIG. 15, the unapproved user-input device comprises mouse 114 and the target user-actuatable input components comprise the position tracking system of mouse 114. As noted above, the keyboard 116 and mouse 114 may be connected to an intermediate device 118 that may modify the target input signals to resemble input signals from the controller 110.

In the example of FIG. 14 and like histogram 1200, histogram 1400 represents x-axis positions and comprises 10 position bins along the horizontal axis that each represent a range of x-axis values generated by the keys 120 of the keyboard 116. In this example, the minimum position bin 1402 and the maximum position bin 1422 each have values greater than zero. Additionally, position bins 1404, 1406, 1410, 1414 and 1418 contain zero values. As noted above, this may occur when a key 120, which provide a binary (e.g. on/off) signal, is used to spoof the input signal typically generated by a thumbstick 202 that provides an analog input control signal based on a position of the thumbstick. As a result, the input signal from a key 120 may skip over intermediate values to reach a set value.

In the example of FIG. 15 and like histogram 1400, histogram 1500 represents x-axis positions and comprises 10 position bins that each represent a range of x-axis values generated the mouse 114. Unlike histogram 1400, however, the x-axis values generated by the mouse 114 do not include the minimum position bin 1502 or the maximum position bin 1522. In other words, the x-axis positions generated by the mouse 114 only span from the (−0.8, −0.6) position bin to (+0.6, +0.8) position bin in histogram 1500. Accordingly, in an example where symmetry comprises having values greater than zero in both minimum and maximum positions of input signal representations, the histograms 1400 and 1500 may be determined to be asymmetrical.

Additionally, and also unlike histogram 1400, in histogram 1500 the middle 8 position bins between minimum position bin 1502 and maximum position bin 1522 each contain non-zero values. Accordingly, in another example where symmetry comprises having non-zero values populated in all position bins between the minimum and maximum position bins, the histograms 1400 and 1500 may be determined to be asymmetrical. In another example, where symmetry comprises both (1) having values greater than zero in both minimum and maximum positions, and (2) having non-zero values populated in all position bins between the minimum and maximum position bins, the histograms 1400 and 1500 may be determined to be asymmetrical.

Accordingly, one of the plurality of rules 412 applied to generate the confidence score 414 may include comparing representations of at least two of the plurality of input signals, wherein each of the representations corresponds to a movement pattern of the target user-actuatable input component generating the corresponding input signal. Where the device identification application 404 determines that the representations are asymmetrical, the application may adjust the confidence score to indicate a lower likelihood that the target user-actuatable input components are associated with an approved input device.

The rules 412 that are applied to generate the confidence score 414 may also include comparing a number of zero values in at least one input signal to a threshold number to determine if a target user-actuatable input component corresponding to the at least one input signal is associated with an approved input device.

In one example of an approved input device, video game controller 110 may send no zero values or a small number of zero values to the computing device 402 during use. However, some intermediate devices 118 used to modify input signals from unapproved input devices may inject and send additional zero values to the computing device. Accordingly, a threshold number of zero values may be established to characterize an approved input device 110. In some examples such a threshold number may be a discrete value, such as zero, 50, 100, or other fixed value recorded within a predetermined capture period. In other examples the threshold number may be a percentage of inputs received in a capture period, such as 2%, 3%, 5%, or other suitable percentage.

Accordingly, where the number of zero values in at least one input signal of the plurality of input signals exceeds the threshold number, the device identification application 404 may adjust the confidence score to indicate a lower likelihood that the target user-actuatable input components are associated with an approved input device.

Various combinations of rules 412 may be applied to a plurality of input signals to generate a confidence score 414. In some examples, each rule may be assigned a weight to generate the confidence score 414. When a rule is satisfied, the confidence score may be incremented by the rule's weighting. If the rule is not satisfied, the confidence score may be decremented by the rule's weighting.

The confidence score may be computed by any suitable mathematical operation, including addition. One possible weighting scheme is to assign each rule in a plurality of rules an equal weight, such as 1.0. Another possible weighting scheme may assign different rules with different weights to emphasize rules that may be more useful in identifying approved and unapproved user input devices. When all rules in a collection of rules have been applied, the confidence score may be compared to a threshold score to determine if the plurality of target user-actuatable input components are associated with the approved input device. In one example, the threshold score may be zero, and a positive confidence score indicates that the target user-actuatable input components are associated with the approved input device. By contrast and where the confidence score is negative, the target user-actuatable input components are determined to be associated with an unapproved input device.

In one example, a collection of rules 412 used to generate the confidence score 414 may be defined as: (Rule 1) assigning portions of the input signal to one or more of a plurality of position bins of a histogram and determining whether any position bin contains a zero value; (Rule 2) identifying an extremum value along a first axis in a portion of the input signal, and determining whether the portion of the input signal also includes a non-zero value along a second axis that is orthogonal to the first axis; (Rule 3) identifying an extremum value along a first axis in a first-sampled portion of the input signal, and identifying an extremum value along a second axis orthogonal to the first axis in a second-sampled portion of the input signal that is sampled immediately after the first-sampled portion; (Rule 4) determining a target latency between a first input signal corresponding to a first target user-actuatable input component and a second input signal corresponding to a second target user-actuatable input component, and comparing the target latency to an approved latency between input signals received from two approved user-actuatable input components of the approved input device; (Rule 5) sending a query to a target input device associated with one or more of the target user-actuatable input components, and determining if a target response to the query matches an approved response associated with the approved input device; (Rule 6) monitoring current drawn from the computing device by a target input device that comprises at least one of the target user-actuatable input components, and comparing the current to a threshold current to determine if the target user-actuatable input component is associated with the approved input device; (Rule 7) sending a plurality of queries in one packet to a target input device associated with the target user-actuatable input components, and determining if a target response to the plurality of queries matches an approved response associated with the approved input device; (Rule 8) comparing representations of at least two of the plurality of input signals, wherein each of the representations corresponds to a movement pattern of the target user-actuatable input component generating the corresponding input signal, and determining whether the representations are asymmetrical; and (Rule 9) comparing a number of zero values in at least one input signal of the plurality of input signals to a threshold number to determine if the target user-actuatable input component corresponding to the at least one input signal is associated with the approved input device.

In another example and with reference to the 9 rules in the preceding paragraph, a collection of rules 412 used to generate the confidence score 414 may be defined as: (Rule 1), (Rule 2), (Rule 3), and (Rule 9). In another example, a collection of rules 412 used to generate the confidence score 414 may be defined as: (Rule 1), (Rule 3) and (Rule 9). In another example, a collection of rules 412 used to generate the confidence score 414 may be defined as: (Rule 1), (Rule 2) and (Rule 9). In another example, a collection of rules 412 used to generate the confidence score 414 may be defined as: (Rule 1) and (Rule 9).

Figure 16A:
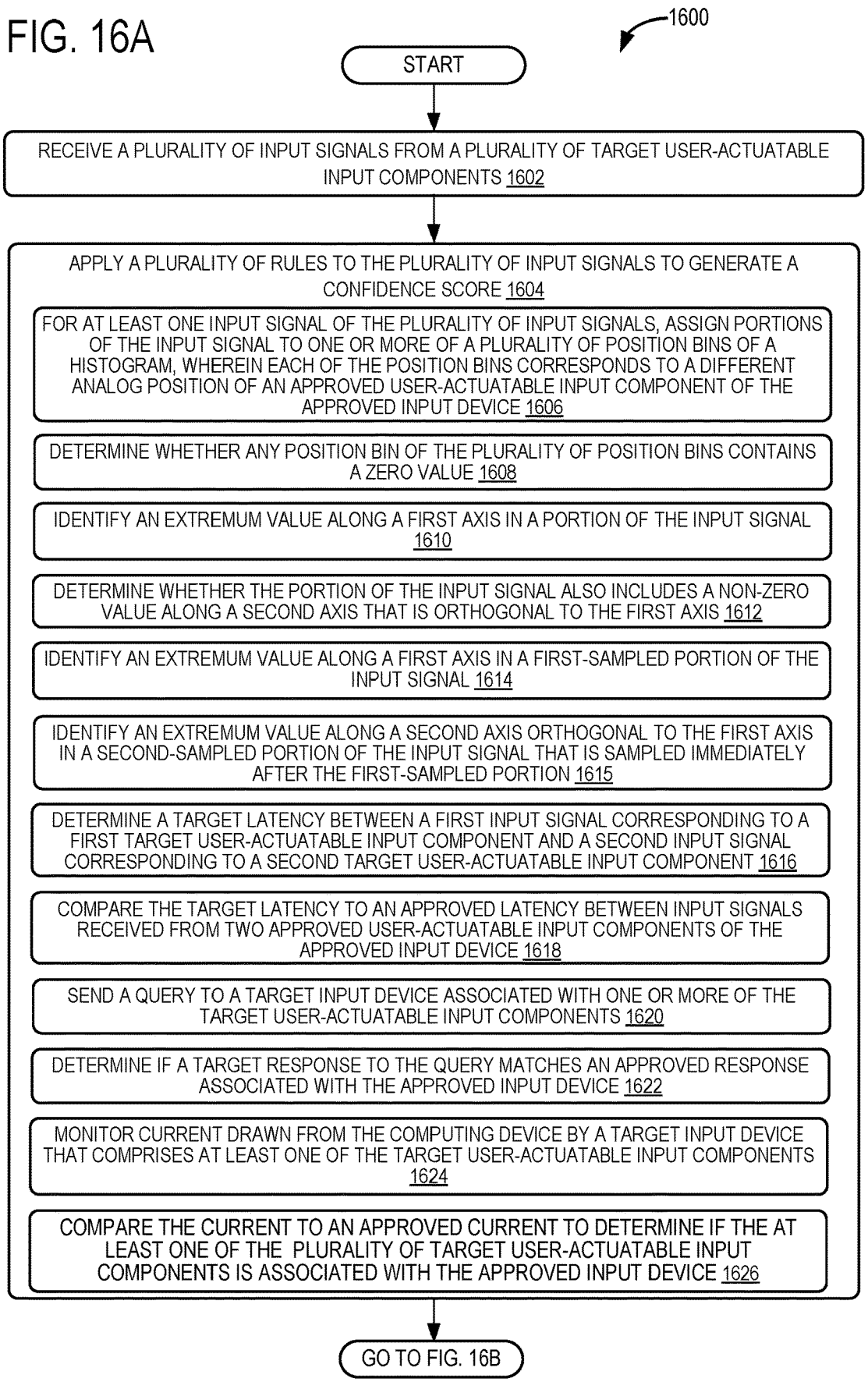
FIGS. 16A and 16B are a block diagram of a method for identifying an approved input device according to examples of the present disclosure.
Figure 16B:
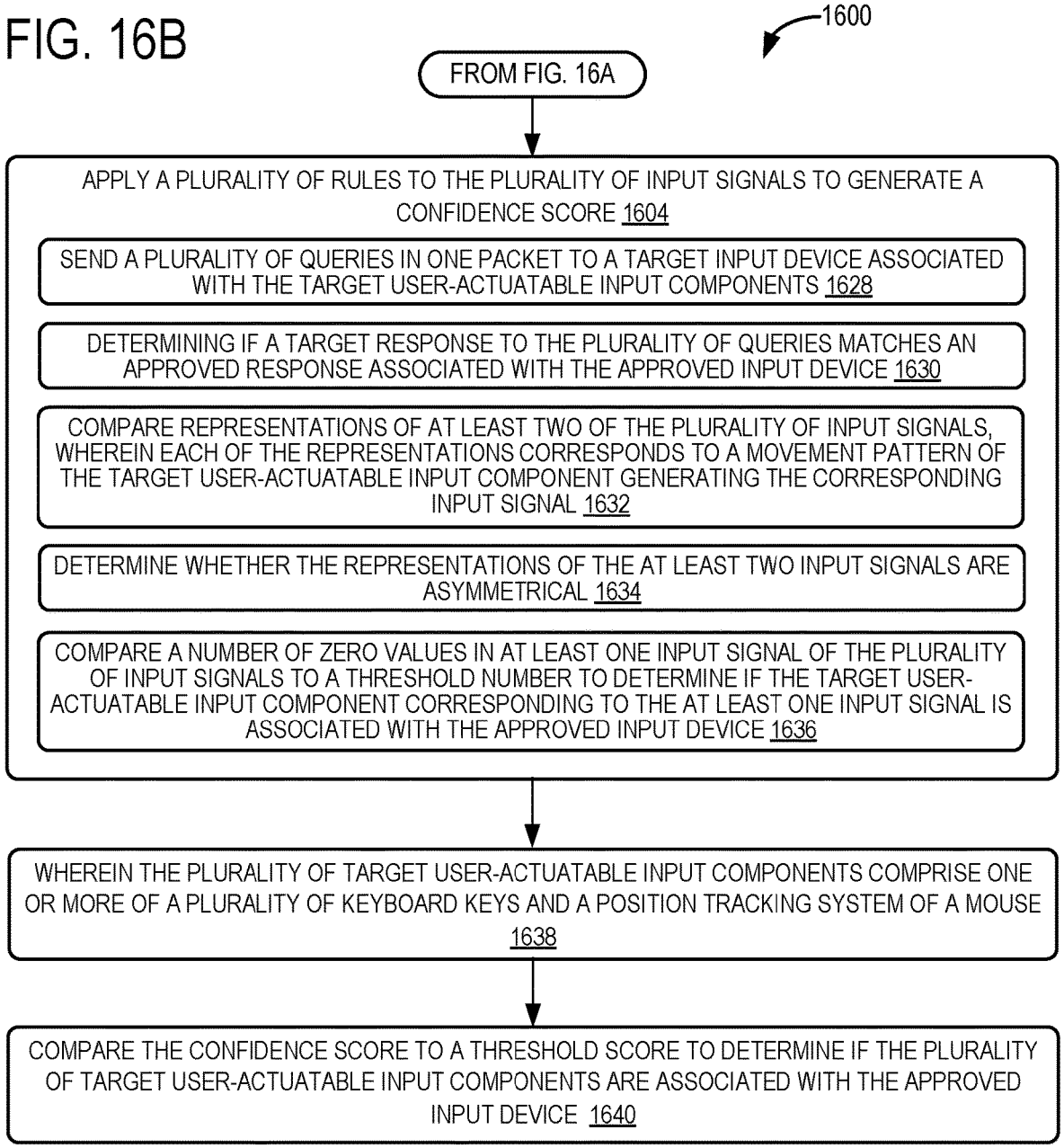

FIGS. 16A and 16B illustrate a flow chart of a method 1600 for identifying an approved input device according to examples of the present disclosure. The following description of method 1600 is provided with reference to the software and hardware components described above and shown in FIGS. 1-15. It will be appreciated that method 1600 also may be performed in other contexts using other suitable hardware and software components.

With reference to FIG. 16A, at 1602 the method 1600 may include receiving a plurality of input signals from a plurality of target user-actuatable input components. At 1604, the method 1600 may include applying a plurality of rules to the plurality of input signals to generate a confidence score. At 1606, the method 1600 may include for at least one input signal of the plurality of input signals, assigning portions of the input signal to one or more of a plurality of position bins of a histogram, wherein each of the position bins corresponds to a different analog position of an approved user-actuatable component of the approved input device. At 1608, the method 1600 may include determining whether any position bin of the plurality of position bins contains a zero value.

At 1610, the method 1600 may include identifying an extremum value along a first axis in a portion of the input signal. At 1612, the method 1600 may include determining whether the portion of the input signal also includes a non-zero value along a second axis that is orthogonal to the first axis. At 1614, the method 1600 may include identifying an extremum value along a first axis in a first-sampled portion of the input signal. At 1615, the method may include identifying an extremum value along a second axis orthogonal to the first axis in a second-sampled portion of the input signal that is sampled immediately after the first-sampled portion.

At 1616, the method 1600 may include determining a target latency between a first input signal corresponding to a first target user-actuatable input component and a second input signal corresponding to a second target user-actuatable input component of the plurality of target user-actuatable input components. At 1618, the method 1600 may include comparing the target latency to an approved latency between input signals received from two approved user-actuatable input components of the approved input device.

At 1620, the method 1600 may include sending a query to a target input device associated with one or more of the target user-actuatable input components. At 1622, the method 1600 may include determining if a target response to the query matches an approved response associated with the approved input device. At 1624, the method 1600 may include monitoring current drawn from the computing device by a target input device that comprises at least one of the target user-actuatable input components. At 1626, the method 1600 may include comparing the current to a threshold current to determine if the at least one of the target user-actuatable input components are associated with the approved input device.

With reference now to FIG. 16B, at 1628, the method 1600 may include sending a plurality of queries in one packet to a target input device associated with the target user-actuatable input components. At 1630, the method 1600 may include determining if a target response to the plurality of queries matches an approved response associated with the approved input device. At 1632, the method 1600 may include comparing representations of at least two of the plurality of input signals, wherein each of the representations corresponds to a movement pattern of the target user-actuatable input component generating the corresponding input signal. At 1634, the method 1600 may include determining whether the representations of the at least two input signals are asymmetrical.

At 1636, the method 1600 may include comparing a number of zero values in at least one input signal of the plurality of input signals to a threshold number to determine if the target user-actuatable input component corresponding to the at least one input signal is associated with the approved input device. At 1638, the method 1600 may include wherein the plurality of target user-actuatable input components comprise one or more of a plurality of keyboard keys and a position tracking system of a mouse. At 1640, the method 1600 may include comparing the confidence score to a threshold score to determine if the plurality of target user-actuatable input components are associated with the approved input device.

It will be appreciated that method 1600 is provided by way of example and is not meant to be limiting. Therefore, it is to be understood that method 1600 may include additional and/or alternative steps relative to those illustrated in FIGS. 16A and 16B. Further, it is to be understood that method 1600 may be performed in any suitable order. Further still, it is to be understood that one or more steps may be omitted from method 1600 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
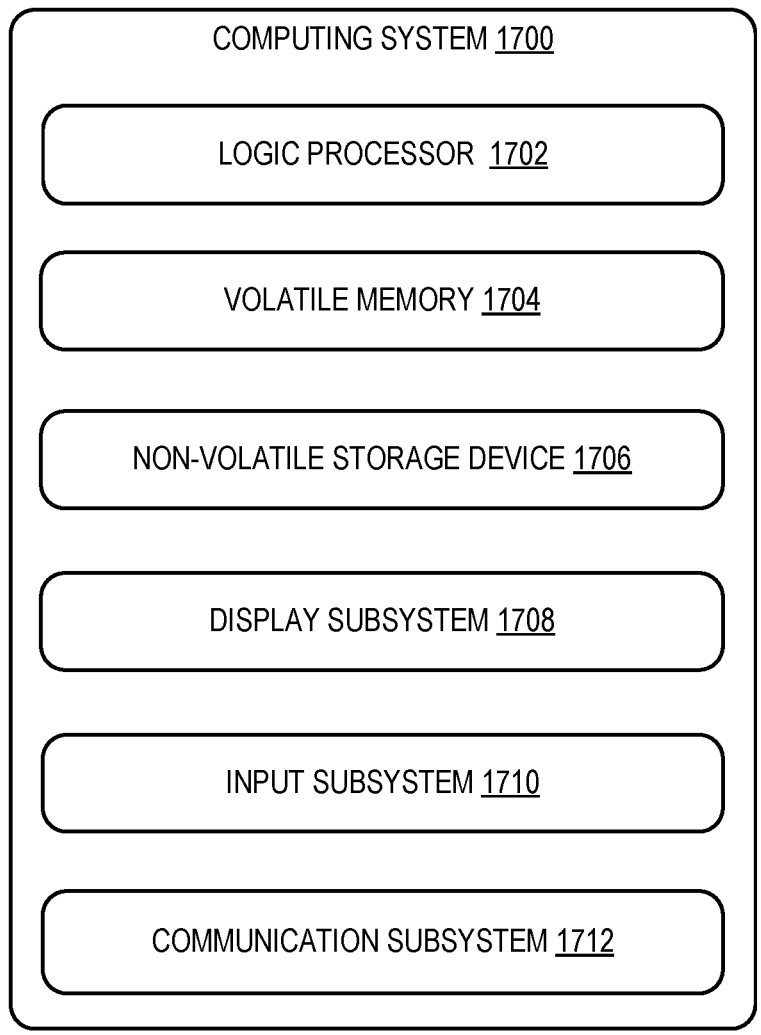
FIG. 17 shows a block diagram of an example computing device according to examples of the present disclosure.

FIG. 17 schematically shows a non-limiting embodiment of a computing system 1700 that can enact one or more of the methods and processes described above. Computing system 1700 is shown in simplified form. Computing system 1700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. In the above examples, video game console 104, computing device 402, controller 110, and intermediate device 118 may comprise computing system 1700 or one or more aspects of computing system 1700.

Computing system 1700 includes a logic processor 1702, volatile memory 1704, and a non-volatile storage device 1706. Computing system 1700 may optionally include a display subsystem 1708, input subsystem 1710, communication subsystem 1712, and/or other components not shown in FIG. 17.

Logic processor 1702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1706 includes one or more physical devices configured to hold instructions executable by the logic processors to implement the methods and processes described herein. When such methods and processes are implemented, the state of non-volatile storage device 1706 may be transformed—e.g., to hold different data.

Non-volatile storage device 1706 may include physical devices that are removable and/or built-in. Non-volatile storage device 1706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1706 may include nonvolatile, dynamic, static, read/write, read-only, sequential-access, location-addressable, file-addressable, and/or content-addressable devices. It will be appreciated that non-volatile storage device 1706 is configured to hold instructions even when power is cut to the non-volatile storage device 1706.

Volatile memory 1704 may include physical devices that include random access memory. Volatile memory 1704 is typically utilized by logic processor 1702 to temporarily store information during processing of software instructions. It will be appreciated that volatile memory 1704 typically does not continue to store instructions when power is cut to the volatile memory 1704.

Aspects of logic processor 1702, volatile memory 1704, and non-volatile storage device 1706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 1700 typically implemented in software by a processor to perform a particular function using portions of volatile memory, which function involves transformative processing that specially configures the processor to perform the function. Thus, program or application may be instantiated via logic processor 1702 executing instructions held by non-volatile storage device 1706, using portions of volatile memory 1704. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

When included, display subsystem 1708 may be used to present a visual representation of data held by non-volatile storage device 1706. As the herein described methods and processes change the data held by the non-volatile storage device, and thus transform the state of the non-volatile storage device, the state of display subsystem 1708 may likewise be transformed to visually represent changes in the underlying data. Display subsystem 1708 may include one or more display devices utilizing virtually any type of technology. Such display devices may be combined with logic processor 1702, volatile memory 1704, and/or nonvolatile storage device 1706 in a shared enclosure, or such display devices may be peripheral display devices.

When included, input subsystem 1710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1712 may be configured to communicatively couple various computing devices described herein with each other, and with other devices. Communication subsystem 1712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1700 to send and/or receive messages to and/or from other devices via a network such as the Internet.

The following paragraphs provide additional support for the claims of the subject application. One aspect provides a method for identifying an approved input device at a computing device, the method comprising receiving a plurality of input signals from a plurality of target user-actuatable input components operated by a user, applying a plurality of rules to the plurality of input signals to generate a confidence score, and comparing the confidence score to a threshold score to determine if the plurality of target user-actuatable input components are associated with the approved input device. The plurality of target user-actuatable input components may additionally or alternatively include one or more of a plurality of keyboard keys and a position tracking system of a mouse.

The method may additionally or alternatively include, for at least one input signal of the plurality of input signals, assigning portions of the input signal to one or more of a plurality of position bins of a histogram, wherein each of the position bins corresponds to a different analog position of an approved user-actuatable input component of the approved input device, and wherein applying the plurality of rules comprises determining whether any position bin of the plurality of position bins contains a zero value. Applying the plurality of rules may additionally or alternatively include, for at least one input signal of the plurality of input signals, identifying an extremum value along a first axis in a portion of the input signal, and determining whether the portion of the input signal also includes a non-zero value along a second axis that is orthogonal to the first axis. Applying the plurality of rules may additionally or alternatively include, for at least one input signal of the plurality of input signals, identifying an extremum value along a first axis in a first-sampled portion of the input signal, and identifying an extremum value along a second axis orthogonal to the first axis in a second-sampled portion of the input signal that is sampled immediately after the first-sampled portion.

The method may additionally or alternatively include determining a target latency between a first input signal corresponding to a first target user-actuatable input component and a second input signal corresponding to a second target user-actuatable input component of the plurality of target user-actuatable input components, and wherein applying the plurality of rules comprises comparing the target latency to an approved latency between input signals received from two approved user-actuatable input components of the approved input device. The method may additionally or alternatively include sending a query to a target input device associated with one or more of the target user-actuatable input components and determining if a target response to the query matches an approved response associated with the approved input device. The method may additionally or alternatively include monitoring current drawn from the computing device by a target input device that comprises at least one of the target user-actuatable input components and comparing the current to an approved current to determine if the at least one of the plurality of target user-actuatable input components is associated with the approved input device.

The method may additionally or alternatively include sending a plurality of queries in one packet to a target input device associated with the target user-actuatable input components and determining if a target response to the plurality of queries matches an approved response associated with the approved input device. The method may additionally or alternatively include comparing representations of at least two of the plurality of input signals, wherein each of the representations corresponds to a movement pattern of the target user-actuatable input component generating the corresponding input signal, and wherein applying the plurality of rules comprises determining whether the representations of the at least two input signals are asymmetrical. Applying the plurality of rules may additionally or alternatively include comparing a number of zero values in at least one input signal of the plurality of input signals to a threshold number to determine if the target user-actuatable input component corresponding to the at least one input signal is associated with the approved input device.

Another aspect provides a computing device for identifying an approved input device, the computing device comprising a processor and a memory holding instructions executable by the processor to receive a plurality of input signals from a plurality of target user-actuatable input components operated by a user, apply a plurality of rules to the plurality of input signals to generate a confidence score and compare the confidence score to a threshold score to determine if the plurality of target user-actuatable input components are associated with the approved input device. The instructions executable by the processor may additionally or alternatively include, for at least one input signal of the plurality of input signals, assigning portions of the input signal to one or more of a plurality of position bins of a histogram, where each of the position bins corresponds to a different analog position of an approved user-actuatable component of the approved input device and determining whether any position bin of the plurality of position bins contains a zero value.

The instructions executable by the processor may additionally or alternatively include, for at least one input signal of the plurality of input signals, identifying an extremum value along a first axis in a portion of the input signal and determining whether the portion of the signal also includes a non-zero value along a second axis that is orthogonal to the first axis. The instructions executable by the processor may additionally or alternatively include, for at least one input signal of the plurality of input signals, identifying an extremum value along a first axis in a first-sampled portion of the input signal, and identifying an extremum value along a second axis orthogonal to the first axis in a second-sampled portion of the input signal that is sampled immediately after the first-sampled portion.

The instructions executable by the processor may additionally or alternatively include determining a target latency between a first input signal corresponding to a first target user-actuatable input component and a second input signal corresponding to a second target user-actuatable input component of the plurality of target user-actuatable input components, and comparing the target latency to an approved latency between input signals received from two approved user-actuatable input components of the approved input device. The instructions executable by the processor may additionally or alternatively include sending one or more queries in one or more packets to a target input device associated with one or more of the target user-actuatable input components, and determining if a target response matches an approved response associated with the approved input device. The instructions executable by the processor may additionally or alternatively include monitoring current drawn from the computing device by a target input device that comprises at least one of the target user-actuatable input components, and comparing the current to an approved current to determine if the at least one of the plurality of target user-actuatable input components is associated with the approved input device. The instructions executable by the processor may additionally or alternatively include comparing a number of zero values in at least one input signal of the plurality of input signals to a threshold number to determine if the target user-actuatable input component corresponding to the at least one input signal is associated with the approved input device.

Another aspect provides a computing device for identifying an approved input device, the computing device comprising a processor and a memory holding instructions executable by the processor to receive a plurality of input signals from a plurality of target user-actuatable input components comprising a plurality of keyboard keys and a position tracking system of a mouse operated by a user, apply a plurality of rules to the plurality of input signals to generate a confidence score, and compare the confidence score to a threshold score to determine if the plurality of target user-actuatable input components are associated with the approved input device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for identifying an approved input device, the method comprising:
receiving a plurality of input signals from a plurality of target user-actuatable input components operated by a user;
applying a plurality of different rules to the plurality of input signals to generate a confidence score, wherein generating the confidence score comprises assigning a weight to each rule of the plurality of different rules;
wherein applying the plurality of different rules comprises one or more of
(1) for at least one input signal of the plurality of input signals, assigning portions of the input signal to one or more of a plurality of position bins of a histogram, wherein each of the position bins corresponds to a different analog position of an approved user-actuatable input component of the approved input device, and determining whether any position bin of the plurality of position bins contains a zero value,
(2) for at least one input signal of the plurality of input signals, identifying an extremum value along a first axis in a portion of the input signal, and determining whether the portion of the input signal also includes a non-zero value along a second axis that is orthogonal to the first axis,
(3) for at least one input signal of the plurality of input signals, identifying an extremum value along a first axis in a first-sampled portion of the input signal, and identifying an extremum value along a second axis orthogonal to the first axis in a second-sampled portion of the input signal that is sampled immediately after the first-sampled portion, and
(4) comparing representations of at least two of the plurality of input signals, wherein each of the representations corresponds to a movement pattern of the target user-actuatable input component generating the corresponding input signal, and determining whether the representations of the at least two input signals are asymmetrical; and
comparing the confidence score to a threshold score to determine if the plurality of target user-actuatable input components are associated with the approved input device.

2. The method of claim 1, wherein the plurality of target user-actuatable input components comprise one or more of a plurality of keyboard keys and a position tracking system of a mouse.

3. The method of claim 1, further comprising:
determining a target latency between a first input signal corresponding to a first target user-actuatable input component and a second input signal corresponding to a second target user-actuatable input component of the plurality of target user-actuatable input components; and
wherein applying the plurality of different rules comprises comparing the target latency to an approved latency between input signals received from two approved user-actuatable input components of the approved input device.

4. The method of claim 1, further comprising:
sending a query to a target input device; and
determining if a target response to the query matches an approved response associated with the approved input device.

5. The method of claim 1, further comprising:
comparing a current to an approved current to determine if the at least one of the plurality of target user-actuatable input components is associated with the approved input device.

6. The method of claim 1, further comprising:
sending a plurality of queries in one packet to a target input device; and
determining if a target response to the plurality of queries matches an approved response associated with the approved input device.

7. A computing device for identifying an approved input device, the computing device comprising:
a processor; and
a memory holding instructions executable by the processor to:
receive a plurality of input signals from a plurality of target user-actuatable input components operated by a user;
apply a plurality of different rules to the plurality of input signals to generate a confidence score, wherein generating the confidence score comprises assigning a weight to each rule of the plurality of different rules;
wherein applying the plurality of different rules comprises one or more of
(1) for at least one input signal of the plurality of input signals, assigning portions of the input signal to one or more of a plurality of position bins of a histogram, wherein each of the position bins corresponds to a different analog position of an approved user-actuatable input component of the approved input device, and determining whether any position bin of the plurality of position bins contains a zero value,
(2) for at least one input signal of the plurality of input signals, identifying an extremum value along a first axis in a portion of the input signal, and determining whether the portion of the input signal also includes a non-zero value along a second axis that is orthogonal to the first axis,
(3) for at least one input signal of the plurality of input signals, identifying an extremum value along a first axis in a first-sampled portion of the input signal, and identifying an extremum value along a second axis orthogonal to the first axis in a second-sampled portion of the input signal that is sampled immediately after the first-sampled portion, and
(4) comparing representations of at least two of the plurality of input signals, wherein each of the representations corresponds to a movement pattern of the target user-actuatable input component generating the corresponding input signal, and determining whether the representations of the at least two input signals are asymmetrical; and
compare the confidence score to a threshold score to determine if the plurality of target user-actuatable input components are associated with the approved input device.

8. The computing device of claim 7, wherein the instructions executable by the processor to:
determine a target latency between a first input signal corresponding to a first target user-actuatable input component and a second input signal corresponding to a second target user-actuatable input component of the plurality of target user-actuatable input components; and
compare the target latency to an approved latency between input signals received from two approved user-actuatable input components of the approved input device.

9. The computing device of claim 7, wherein the instructions executable by the processor to:
send one or more queries in one or more packets to a target input device; and
determine if a target response matches an approved response associated with the approved input device.

10. The computing device of claim 7, wherein the instructions executable by the processor to:
compare a current to an approved current to determine if the at least one of the plurality of target user-actuatable input components is associated with the approved input device.

11. A computing device for identifying an approved input device, the computing device comprising:
a processor; and
a memory holding instructions executable by the processor to:
receive a plurality of input signals from a plurality of target user-actuatable input components comprising a plurality of keyboard keys and a position tracking system of a mouse operated by a user;
apply a plurality of different rules to the plurality of input signals to generate a confidence score, wherein generating the confidence score comprises assigning a weight to each rule of the plurality of different rules;
wherein applying the plurality of different rules comprises one or more of
(1) for at least one input signal of the plurality of input signals, assigning portions of the input signal to one or more of a plurality of position bins of a histogram, wherein each of the position bins corresponds to a different analog position of an approved user-actuatable input component of the approved input device, and determining whether any position bin of the plurality of position bins contains a zero value,
(2) for at least one input signal of the plurality of input signals, identifying an extremum value along a first axis in a portion of the input signal, and determining whether the portion of the input signal also includes a non-zero value along a second axis that is orthogonal to the first axis,
(3) for at least one input signal of the plurality of input signals, identifying an extremum value along a first axis in a first-sampled portion of the input signal, and identifying an extremum value along a second axis orthogonal to the first axis in a second-sampled portion of the input signal that is sampled immediately after the first-sampled portion, and
(4) comparing representations of at least two of the plurality of input signals, wherein each of the representations corresponds to a movement pattern of the target user-actuatable input component generating the corresponding input signal, and determining whether the representations of the at least two input signals are asymmetrical; and
compare the confidence score to a threshold score to determine if the plurality of target user-actuatable input components are associated with the approved input device.

12. The method of claim 1, wherein at least two of the rules have different weights.

13. The computing device of claim 7, wherein at least two of the rules have different weights.

14. The computing device of claim 11, wherein at least two of the rules have different weights.

* * * * *